US012618593B2

(12) United States Patent
Jiang et al.

(10) Patent No.: US 12,618,593 B2
(45) Date of Patent: May 5, 2026

(54) CRYOGENIC COOLING SYSTEM

(71) Applicant: Oxford Nanoscience Limited, Abingdon (GB)

(72) Inventors: Linshu Jiang, Abingon (GB); Robin Brzakalik, Abingdon (GB); Chris Wilkinson, Abingdon (GB); Anthony Matthews, Abingdon (GB); Matthew Martin, Abingdon (GB); Timothy Poole, Abingdon (GB); Timothy Foster, Abingdon (GB)

(73) Assignee: Oxford Nanoscience Limited, Abingdon (GB)

( * ) Notice: Subject to any disclaimer, the term of this patent is extended or adjusted under 35 U.S.C. 154(b) by 0 days.

(21) Appl. No.: 19/194,467

(22) Filed: Apr. 30, 2025

(65) Prior Publication Data

US 2025/0271181 A1     Aug. 28, 2025

Related U.S. Application Data

(60) Division of application No. 18/673,039, filed on May 23, 2024, now Pat. No. 12,320,557, which is a
(Continued)

(30) Foreign Application Priority Data

May 16, 2022     (GB) ..................................... 2207170

(51) Int. Cl.
*F25B 19/00*          (2006.01)
*F25D 19/00*          (2006.01)
(Continued)

(52) U.S. Cl.
CPC .......... *F25B 19/005* (2013.01); *F25D 19/006* (2013.01); *F25D 19/04* (2013.01);
(Continued)

(58) Field of Classification Search
CPC .... F25B 19/005; F25B 9/006; F25B 2500/01; F25B 9/10; F25B 9/12; F25D 19/006; F25D 19/04; G06N 10/40; F17C 3/027
See application file for complete search history.

(56) References Cited

U.S. PATENT DOCUMENTS 4,277,949 A     7/1981   Longsworth
4,499,737 A     2/1985   Binnig et al.
(Continued)

FOREIGN PATENT DOCUMENTS

CA          1164672 A       4/1984
CN          102359860 A     2/2012
(Continued)

OTHER PUBLICATIONS

Magnard, P et al, Microwave Quantum Link between Superconducting Circuits Housed in Spatially Separated Cryogenic Systems, Phys. Rev. Lett. 125, 260502, Dec. 21, 2020.
(Continued)

*Primary Examiner* — Frantz F Jules
*Assistant Examiner* — Webeshet Mengesha
(74) *Attorney, Agent, or Firm* — BLANK ROME LLP

(57)          ABSTRACT

A cryogenic cooling system is provided comprising a cryogenic refrigerator assembly and two or more connected modules. The cryogenic refrigerator assembly comprises one or more cryogenic refrigerators. Each said connected module comprises: a housing defining an internal volume for the module, the housing having a plurality of side faces, and a plurality of stages arranged within the internal volume for the module, wherein one or more of the plurality of stages is thermally coupled to the cryogenic refrigerator assembly. The two or more said modules are mutually connected at
(Continued)

respective side faces, and a first said stage of a first said module is thermally coupled to a first said stage of a second said module.

30 Claims, 11 Drawing Sheets

Related U.S. Application Data continuation of application No. PCT/GB2023/051226, filed on May 10, 2023.

(51) Int. Cl.

| | | |
|---|---|---|
| *F25D 19/04* | (2006.01) | |
| *F25B 9/10* | (2006.01) | |
| *F25B 9/12* | (2006.01) | |
| *G06N 10/40* | (2022.01) | |

(52) U.S. Cl.

CPC . *F25B 9/10* (2013.01); *F25B 9/12* (2013.01); *F25B 2500/01* (2013.01); *G06N 10/40* (2022.01)

(56) References Cited

U.S. PATENT DOCUMENTS

| | | | |
|---|---|---|---|
| 4,672,823 A | 6/1987 | Benoit et al. | |
| 5,381,666 A | 1/1995 | Saho et al. | |
| 5,829,270 A | 11/1998 | Mikheev | |
| 6,415,611 B1 | 7/2002 | Acharya et al. | |
| 6,477,847 B1 | 11/2002 | Bonaquist et al. | |
| 6,640,552 B1 | 11/2003 | Rampersad et al. | |
| 6,758,059 B2 | 7/2004 | Kelly et al. | |
| 7,128,231 B2 | 10/2006 | Overholt | |
| 7,228,686 B2 | 6/2007 | Royal et al. | |
| 7,266,954 B2 | 9/2007 | Yamada | |
| 7,287,387 B2 | 10/2007 | Kirichek et al. | |
| 7,323,963 B2 | 1/2008 | Nemoto et al. | |
| 8,191,380 B2 | 6/2012 | Aragon | |
| 8,464,542 B2 | 6/2013 | Hilton et al. | |
| 8,818,471 B2 | 8/2014 | Kawashima | |
| 9,816,750 B2 | 11/2017 | Batey et al. | |
| 9,969,527 B2 | 5/2018 | Smith et al. | |
| 10,378,803 B2 | 8/2019 | Uchaykin | |
| 10,677,499 B2 | 6/2020 | Anant et al. | |
| 10,724,780 B2 | 7/2020 | Yao et al. | |
| 11,125,475 B2 | 9/2021 | Matthews | |
| 11,480,299 B1 * | 10/2022 | Najafi-Yazdi | F17C 13/007 |
| 12,313,320 B2 | 5/2025 | Tillemann-Dick et al. | |
| 2005/0229609 A1 | 10/2005 | Kirichek et al. | |
| 2006/0266053 A1 | 11/2006 | Jiang et al. | |
| 2007/0121272 A1 | 5/2007 | Vladimir et al. | |
| 2008/0104968 A1 | 5/2008 | Radovinsky et al. | |
| 2011/0185766 A1 | 8/2011 | Benoit et al. | |
| 2013/0133341 A1 | 5/2013 | Viargues | |
| 2013/0160975 A1 | 6/2013 | Stautner | |
| 2016/0377230 A1 | 12/2016 | Chuard et al. | |
| 2018/0347866 A1 | 12/2018 | Amthor et al. | |
| 2019/0113255 A1 | 4/2019 | de Waele et al. | |
| 2019/0383525 A1 | 12/2019 | Matthews et al. | |
| 2020/0045849 A1 | 2/2020 | Alekseev | |
| 2020/0209330 A1 | 7/2020 | Popescu | |
| 2020/0348054 A1 | 11/2020 | Schuster et al. | |
| 2020/0370792 A1 * | 11/2020 | Matthews | F25B 9/12 |
| 2021/0356193 A1 | 11/2021 | Dhuley | |
| 2023/0090979 A1 | 3/2023 | Matthews et al. | |
| 2023/0349514 A1 | 11/2023 | Staley et al. | |

FOREIGN PATENT DOCUMENTS

| | | |
|---|---|---|
| CN | 108036582 A | 5/2018 |
| CN | 108800638 A | 11/2018 |
| CN | 107830651 B | 4/2020 |
| DE | 3435229 C2 | 6/1989 |
| EP | 3049736 A4 | 6/2017 |
| EP | 2742299 B1 | 7/2017 |
| EP | 3477225 A1 | 5/2019 |
| EP | 4184081 A1 | 5/2023 |
| FR | 2914050 B1 | 12/2012 |
| GB | 1365368 A | 9/1974 |
| GB | 2301174 B | 11/1996 |
| GB | 2592415 A | 9/2021 |
| IN | 202021047505 A | 3/2022 |
| JP | 02136654 A | 5/1990 |
| JP | 1998073333 A | 3/1997 |
| JP | 2001304709 A | 10/2001 |
| JP | 3338381 B2 | 10/2002 |
| JP | 3668919 B2 | 7/2005 |
| JP | 200778310 A | 3/2007 |
| JP | 2008241215 A | 10/2008 |
| JP | 2009074774 A | 4/2009 |
| JP | 2010210195 A | 9/2010 |
| JP | 4791894 B2 | 10/2011 |
| JP | 5028117 B2 | 6/2012 |
| JP | 2019078481 A | 5/2019 |
| WO | 2006119418 A2 | 11/2006 |
| WO | 2010002245 A | 1/2010 |
| WO | 2010106309 A2 | 9/2010 |
| WO | 2020154745 A1 | 7/2020 |
| WO | 2023089233 A1 | 5/2023 |
| WO | 2023203277 A1 | 10/2023 |

OTHER PUBLICATIONS

Hollister, M et al, "A large millikelvin platform at Fermilab for quantum computing applications", Fermi National Accelerator Laboratory, Batavia, IL, USA, available at https://arxiv.org/abs/2108.10816v1 [physics.ins-det], Aug. 24, 2021.

Annual Report Jahresbericht, Walther-Meisner-Institut, 2016, Garching, Germany (available at https://www.wmi.badw.de/publications).

Van Der Vliet, Harriet, Introducing ProteoxQX: Our Largest Modular Dilution Refrigerator System—Nanoscience—Oxford Instruments (oxinst.com) Apr. 12, 2023.

International Search Report, mail date Jul. 31, 2023, 11 pages, received in corresponding PCT application No. PCT/GB2023/051226.

Meet S-Cube: Modular Vacuum Chamber System, Streicher Gruppe, YouTube, Jun. 8, 2020 https://www.youtube.com/watch?v=edOu2Y0gzj4.

The IBM Quantum State of the Union, IBM Research, YouTube, Nov. 17, 2021, https://www.youtube.com/watch?v=-qBrLqvESNM.

Bluefors KIDE large-scale cryogenic platform for quantum computing, Nov. 18, 2021 https://www.youtube.com/watch?v=KkMeC6owgiY.

Franklin et al. 'Versatile Millikelvin Hybrid Cooling Platform for Superconductivity Research', Aug. 22, 2017 2302.05766 (arxiv.org).

Maybell, "The Maybell Icebox," Mar. 26, 2022, available at https://web.archive.org/web/20220326084542/https:/www.maybellquantum.com/icebox.

Uhlig, K., Cryogen-free dilution refrigerators, Journal of Physics: Conference Series 400 (2012) 052039, 25th International Conference on Low Temperature Physics (LT26), IOP Publishing, Moscow, Russia, pp. 1-4, doi: 10.1088/1742-6596/400/5/052039, vol. 400 (5):10—Dec. 17, 2012.

Edelman, V.S., An autonomous dilution micro refrigerator, Journal of Physics: Conference Series 150 (2009) 012011, vol. 150 (1):, 25th International Conference on Low Temperature Physics (LT25), IOP Publishing, Moscow, Russia, pp. 1-4, doi: 10.1088/1742-6596/150/1/1012011, vol. 150 (1): 4—Feb. 1, 2009.

"Dilution refrigerator for quantum computing scale up", Proteox Next Generation Thinking, ProteoxLX, Oxford Instruments, Nanoscience, 13 pages, Jul. 31, 2021.

P. Duthil, "Material Properties at Low Temperature", Institut de Physique Nucléaire d'Orsay, IN2P3-CNRS/Université de Paris Sud, Orsay, France, pp. 1-19, Jan. 28, 2015.

(56)         References Cited

OTHER PUBLICATIONS

"Cryogen-free XLD dilution refrigerator", Bluefors, 28, Sep. 28, 2021, http"//web.archive.org/web/20210928135012/https:bluefors.com/products/xld-dilution refrigerator/.

"Thermal conductivity of G-10", https://trc.nist.gov/cryogenics/materials/G10%20CR%20Fiberglass%20Epoxy/G10CRFiberglassEpoxy_rev.htm, retrieved Dec. 10, 2024.

BF-XLD-Series Cryogen-Free Dilution Referigerator System, , User manual, Version 1.5.0, pp. 1-77, Jan. 2016.

"Introducing KIDE—the New Cryogenic Platform", News Article, https://bluefors.com/news/introducing-kide-the-new-cryogenic-platform/, 3 pages, Nov. 18, 2021.

Ningfeng Zhu et al., "Simons Observatory large aperture telescope receiver design overview", arXiv: 1808.10037v1 [astro-ph.IM], 15 pages, Aug. 29, 2018.

P. Magnard et al., "Microwave Quantum Link between Superconducting Circuits Housed in Spatially Separated Cryogenic Systems", arXiv:2008.01642v1 [quantph], 13 pages, Aug. 4, 2020.

M. Oksanen, et al., "Hybrid System Cools Dry Dilution Refrigerators", Cold Facts vol. 34, No. 3, 2 pages, Jun. 2018.

G. Burghart, "Baseline Design of the Cryogenic System for Eureca", Cern-Thesis-2010-072, 86 pages, Jun. 16, 2010.

"IBM-Bluefors partnership promises really cool quantum future", Inside Quantum Technology News, 1 page, Nov. 17, 2021.

"Bluefors presents new cooling platform at APS March Meeting 2022", https://www.youtube.com/watch?v=4p-N756LML8, Apr. 29, 2022.

Proteox—Next Generation Thinking, Oxford Instruments, YouTube, Mar. 10, 2021, https://www.youtube.com/watch?v=CWfyMddV3M8.

Partanen, M., Fedorov, K., Pogorzalek, S., Renger, M., Chen, Q.-M., Marx, A., Deppe, F., & Gross, R. O. (Mar. 5, 2020). Quantum sensing with superconducting microwave circuits (Abstract R07.00007). APS March Meeting 2020, Denver, CO, United States.

Preliminary opinion of EPO Opposition against EP4271949, mail date Dec. 18, 2025.

* cited by examiner

Priort Art

Priort Art

200

210

135

200

220

135

307
308
366
309
381
366
382
383
307'
308'
309'

300            350

430
407        467        407'        432
431

400            450

CRYOGENIC COOLING SYSTEM

CROSS-REFERENCE TO RELATED APPLICATIONS

This application is a divisional application of and claims priority to U.S. patent application Ser. No. 18/673,039, filed on May 23, 2024, which is a continuation application based on and claims the benefit of International Application PCT/GB2023/051226, filed on May 10, 2023 (published on Aug. 24, 2023), which is itself based on and claims the benefit of Great Britain Application No. 2207170.8, filed on May 16, 2022, entitled "Cryogenic Cooling System", all of which are hereby incorporated by reference in their entirety.

FIELD OF THE INVENTION

The present invention relates to the field of cryogenic cooling systems. A particularly desirable application of the technology is commercial-scale superconducting quantum computing.

BACKGROUND TO THE INVENTION

The scale-up of quantum computing, based on superconducting quantum information processing (QIP) devices, will require a continuously low temperature on the order of 10-20 mK or less for QIP device operation. For this, it is envisaged that dilution refrigerators (DRs) will be essential. Today's industrial QIP companies use commercially-available cryogen-free ("dry") dilution refrigerators that follow a traditional form-factor: a series of vertically-spaced copper plates, with circular cross section, thermally isolated from each other, with a single dilution unit installed between the lower stage plates. Together with the pipework connected to the dilution unit inlet and outlet, and the pumping hardware, a closed cycle dilution refrigerator is created. Concentric, cylindrical radiation shields enclose each stage plate of the dilution refrigerator insert, to reduce the radiated heat load onto the dilution refrigerator stages (~0.8 K at the still stage, down to below 10 mK at the mixing chamber stage). The whole assembly is enclosed in a cylindrical vacuum vessel. The assembly is often frame-mounted to enable radiation shield and outer vacuum chamber (OVC) removal.

An example of a prior art dilution refrigerator, as discussed above, is shown by FIGS. 1 and 2. FIG. 1 shows a perspective view of a cylindrical outer vacuum chamber 1 supported by a cryostat support frame 10. External components of a helium gas handling system 2 and a cryogen-free refrigerator in the form of a pulse tube refrigerator (PTR) 3 are also visible. FIG. 2 is a perspective view of a cross-section taken through the outer vacuum chamber 1. The PTR and dilution unit are not shown in FIG. 2 for sake of clarity. There is a tiered arrangement of thermal stages 5-9, each in the form of a circular plate and being cooled to a respective temperature in use. A nested assembly of cylindrical radiation shields 4 is also visible, with each shield connected to a respective thermal stage. A first stage of the PTR 3 is mounted to a PT1 stage 5, and a second stage of the PTR 3 is mounted to a PT2 stage 6. A dilution unit forms part of the dilution refrigerator, the dilution unit comprising a still and a mixing chamber, connected by a set of heat exchangers. The still is mounted to a still stage 7 and the mixing chamber is mounted to a mixing chamber stage 9. An operational fluid formed of a helium-3/helium-4 mixture is circulated around the dilution unit during operation. The still and the mixing chamber cool the system as a result of a phase change or mixing of the operational fluid. Cooling is obtained at the mixing chamber from the enthalpy of mixing as helium-3 is diluted into helium-4. The mixing chamber is thereby operable so as to obtain the lowest temperature of any part of the dilution refrigerator. Helium-3 is boiled at the still, which removes energy due to the latent heat of vaporisation. A "cold plate" 8, forming a respective thermal stage, is arranged between the still stage 7 and the mixing chamber stage 9 and obtains an intermediate temperature in use. A cylindrical heat radiation shield is connected to each of the PT1 stage 5, PT2 stage 6 and the still stage 7 enclosing the lower temperature stages.

In low temperature applications such as QIP, various dissipative elements are installed across different stages of the dilution refrigerator to ensure adequate thermalisation of experimental wiring. Dissipated heat from resistive elements and conductive wiring adds to the heat load on the dilution refrigerator, which means that more cooling power is required in order to maintain a given base temperature for the system. Although the above form-factor (described with reference to FIGS. 1 and 2) has worked very well in the academic environment, where most dry DR systems have been installed, as QIP scales up in an industrial setting, this form factor starts to become limiting. Large radiation shields are cumbersome to handle. Such a system is fixed in size, which limits the maximum experiment size and the available cooling power at each stage. Whilst it is possible to design a very large vacuum chamber and cryogenic refrigerators as a way of providing physical space for upgradable experiments, the huge capital outlay makes such systems commercially unattractive for both manufacturer and customer. There is therefore a need for a cryogenic cooling system that is better adapted for an industrial or commercial setting. For example, there is a need to compensate for higher heat loads, as may result from the building of ever larger quantum computers, without incurring the above problems, and for facilitating new modes of operation.

SUMMARY OF THE INVENTION

A first aspect of the invention is a cryogenic cooling system comprising a cryogenic refrigerator assembly comprising one or more cryogenic refrigerators; and two or more connected modules, each said connected module comprising:

a housing defining an internal volume for the module, the housing having a plurality of side faces; and a plurality of stages arranged within the internal volume for the module, wherein one or more of the plurality of stages is thermally coupled to the cryogenic refrigerator assembly;

wherein the two or more said modules are mutually connected at respective side faces; and wherein a first said stage of a first said module is thermally coupled to a first said stage of a second said module.

In contrast to the prior art design of FIGS. 1 and 2, the cryogenic cooling system is modularised. This allows the system to be "scaled up" by connecting the interior of a first module to other similar modules, thereby increasing the shared internal volume and the total cooling power available. A user can build the size of their cryogenic cooling system incrementally by connecting additional modules, which addresses the concerns of the high capital expenditure associated with owning a large cryogenic cooling system. Modularising the design can also make it easier to service the system because any shields can be made smaller and a user may need only remove part of the housing for a given module to access the relevant experimental space within. Thermally coupling stages of different connected modules can enable the cooling power of the cryogenic refrigerators to be shared across the system. A user can hence include additional heat dissipating components to their system, typically on or between different cooled stages, and balance this heat load by connecting the module to other modules (for example an $n^{th}$ number of times) rather than replacing the entire system with a larger one. New applications, such as the building QIP server farms, are therefore enabled through this technology.

The cryogenic refrigerator assembly may comprise a common cryogenic refrigerator, such as a liquid helium refrigeration plant, cooling respective stages of two or more modules within the system. Typically, however, the cryogenic refrigerator assembly is configured so that each said connected module comprises a cryogenic refrigerator thermally coupled to one or more of stages of the module. These cryogenic refrigerators may take a number of forms, including cryocoolers, helium-3 or helium-4 refrigerators and dilution refrigerators, as will be discussed. Each said module may have a cryogenic refrigerator mounted to a stage of the module by a high thermal conductivity connection.

One or each said module is preferably configured to operate in a first configuration as an independent cryogenic cooling system. Independent operation typically requires the internal volume of the module to be hermetically sealed by the housing and preferably still evacuated. A removable panel may therefore be fitted to the housing (and preferably a said side face) of the module in the first configuration to enclose the internal volume for the module. Each said module is preferably further configured to operate in a second configuration as a component of an integrated cryogenic cooling system comprising a plurality of said modules mutually connected at respective side faces to form a shared internal volume for the system in which the stages for each said connected module are arranged, wherein in the second configuration the removable panel is removed from the housing. The user may separate the modules and configure one or each in the first configuration, for example to perform different experiments using each module. Alternatively, the user can arrange the modules in the second configuration, for example if a larger total cooling power is required for a target apparatus inside the system. The housing for each said module typically comprises a framework supporting the plurality of side faces. Where provided, the removable panels may be fitted to framework in the first configuration and removed from the framework in the second configuration.

A side face of a said module (e.g. the first said module) is connectable to an opposing side face of another said module (e.g. the second said module), as earlier described. The housing (e.g. the framework) of each said module typically comprises one or more housing connectors for connecting the first said module to the second said module. The one or more housing connectors are typically arranged so that an outer surface of the housing of the first said module is configured to fit to an outer surface of the housing of the second said module in order to form the integrated cryogenic cooling system. This facilitates simple connection between different modules. For example a said housing connector on a first said side surface of the first said module may connect to a said housing connector on a second said surface of the second module, the second said side surface of each said module being opposite to the first said side surface respectively. This front-to-back geometry enables an indefinite number of modules to be connected together in the system. Alternatively two modules may be connected together by connecting a housing connector on a first said surface of a first said module to a housing connector on a similar first said surface of a second said module. A first said module may be connected to two modules (one either side) by connecting a housing connector on a first said surface of the first module to a housing connector on a second said surface of a second said module, and by connecting a housing connector on a second said surface of the first module to a housing connector on a first said surface of a third said module. The one or more housing connectors may comprise a flange, preferably surrounding or provided around the outside of a said removable panel. The housing connectors may further comprise fasteners, for example in the form of an array of bolts and holes, preferably around a sealing member (such as an O-ring seal), for coupling the flanges of different modules together.

A modularised cryogenic cooling system could have side faces that form a number of different tessellating or non-tessellating structures. However, a particular advantage is provided wherein the housing for each said module comprises four orthogonal side faces. This design allows for the modules to readily conform to the geometry of most rooms and for several such modules to be connected together in a space saving manner. More modules can then be connected together to increase the total cooling power of the system, before the available floor space is filled. The orthogonal symmetry also means that connected modules may be closely packed, for example without the need for spacers to couple adjacent modules together. A side face of the first said module is therefore preferably directly connected to a side face of the second said module. By bringing the adjacent modules close together, for example so that the modules directly connect to one another without the use of extension spacers, the total mass that is cooled decreases, which allows for higher cooling efficiencies and lower temperatures to be obtained.

One, more than one or potentially each thermal stage of the first said module may be thermally coupled to a corresponding stage of the second said module and optionally each said remaining module in the system. Typically, a second said stage of the first said module is thermally coupled to a second said stage of the second said module. The connected stages are typically arranged to obtain similar operational/base temperatures in use, for example to within 1-2 K. The system preferably further comprises one or more extension plates, each said extension plate arranged to connect adjacent stages of different modules in the system. The system may hence be arranged so that one or more stages of a first said module are thermally coupled to respective stage(s) of a second said module by one or more extension plates mechanically connecting the said thermally coupled stages. The extension plate(s) may hence enhance the thermal conductivity between stages of adjacent modules. In effect, this enlarges the thermal stages of the first said module, for example, so that experimental services may be shared between different modules. Similarly, the cooling power applied to a stage of a first said module may then be transferred to another stage of an adjacent second module in order to compensate for a higher heat load that may be applied to the second module by experimental services. This means that larger heat loads can be applied to the thermal stages, for example by incorporating more dissipative electrical cabling or elements, as may be desirable in some applications. For example, each said extension plate may be configured so that the effective thermal conductivity between the connected stages is above 5000 W/mK at a temperature of 20 K.

The extension plate(s) may additionally perform a heat shielding function by blocking the direct radiative path between different temperature stages in adjacent modules. For example, the system may comprise a plurality of said extension plates, wherein one or more said extension plates is configured so that the effective thermal conductivity between the connected stages is above 5000 W/mK at a temperature of 20 K, and wherein one or more said extension plates is configured so that the effective thermal conductivity between the connected stages is below 50 W/mK at a temperature of 20 K. The lower thermal conductivity plate(s) may function to increase the structural rigidity of the assembly or the thermal shielding, without providing an effective thermal coupling between the connected stages. This may unlock new modes of operation and experiments that would otherwise be difficult to replicate using a traditional cryostat design.

The connected stages will usually be at a similar height across the different modules. The plurality of stages for each said module are typically arranged in a tiered arrangement, for example with a first said stage extending along a plane parallel to a second said stage and spatially dispersed from the second said stage along an axis normal to the first and second stages. Each said stage of a first said module is preferably then coplanar or substantially coplanar with a corresponding said stage of a second said module. The one or more extension plates are then typically arranged to mechanically connect one or more stages of a first said module to a respective coplanar stage of a second said module. The extension plate(s) are typically planar and may bridge the gap between coplanar stages of adjacent connected modules, effectively extending out these stages to form a common connected stage for the system. The extension plates may be included between any or all of the coplanar stages of connected modules, depending on the experimental need.

One or more of the plurality of stages typically comprise one or more stage connectors for connecting an extension plate between the coplanar or "respective" stages of the first and second said modules. For example, the stage connectors may comprise specific means for connecting to an extension plate, such as an array of fastening members or holes for fastening members provided at the periphery of the respective stages. At least one of the one or more extension plates preferably comprises an expandable joint. Such a joint may maintain mechanical connection between the connected stages during relative movement of said connected stages, for example as might arise from contraction and expansion of the components during thermal cycling. For example, at least one of the one or more extension plates may comprise a braided joint.

Each stage typically forms a platform onto which components of the cryogenic cooling system or heat dissipative elements in an electrical system (for instance) may be mounted. Each stage is typically a plate formed of a highly thermally conductive material at cryogenic temperatures, such as copper. Each stage is typically arranged to obtain a respective base temperature by operation of the cryogenic refrigerator, and so may also be referred to as a "thermal stage". The cryogenic refrigerator is typically configured cool each said stage to cryogenic temperatures in use (these being temperatures below 100 kelvin). The stages are generally arranged so that a longitudinal axis extends normal to the surface of each stage. The cryogenic refrigerator is typically configured to apply a thermal gradient across the stages, typically along the longitudinal axis. The stages are therefore typically arranged so that the base temperature for each stage becomes progressively colder in a direction extending between the plurality of stages.

The system is typically configured so that the plurality of stages for each said module share a common internal volume defined by the housings of the connected modules. The internal volume for the system is typically hermetically sealed from the surrounding environment and the region containing the stages for each module typically evacuated. This allows for operation of the system without the need for gas handling devices to expel any unwanted gases that might liquefy or solidify at low temperatures.

Radiation shields may be provided at each module and connected together to form a larger assembly of radiation shields surrounding the lower temperature components of the system. Each said module typically comprises one or more radiation shields, each said radiation shield being thermally coupled to a respective stage of the module and surrounding one or more remaining stages, each said radiation shield comprising one or more shield surfaces. The system may then further comprise one or more shield extension sections, each said shield extension section connecting coplanar shield surfaces of adjacent connected modules, typically held at the approximately the same temperature in use. For a module housing having four orthogonal side faces and being connected to another module in the system, each said radiation shield may comprises one, two or three orthogonal side surfaces extending perpendicular to the respective thermally coupled stage. It will be appreciated that the plurality of stages of each said module in the system are typically not fully surrounded by the radiation shields of that module because a space should be left for thermally connecting adjacent stages of different modules and/or running experimental services between the modules inside the internal volume.

The one or more radiation shields may further comprise shield connectors for connecting a shield extension section between adjacent radiation shields of a first said module in the second configuration and a second said module in the second configuration. The shield extension sections may be needed where there is a gap between coplanar side surfaces forming part of the radiation shields of adjacent modules, the shield extension sections being provided to bridge this gap so that the shields of adjacent connected modules combine together to surround the lower temperature components of the system.

Different cryogenic refrigerators could be used, including "wet" refrigerators and cryogen-free ("dry") cryocoolers (also referred to herein as mechanical refrigerators) or a combination of both. The use of cryocoolers, such as pulse tube refrigerator, Stirling refrigerators or Gifford-McMahon refrigerators is particularly cost-effective in smaller installations, for example where the system comprises up to three connected modules. For systems having over three modules it is often more efficient to cool stage(s) of one or more modules through thermal contact with a cryogen such as liquid nitrogen or helium. The cryogen may be stored internally within a or each said module, for example in a dewar/reservoir. Alternatively it may be stored in an external refrigeration plant and conveyed through the module(s) by conduits. The cryogenic refrigerator may hence comprise a conduit for circulating a cryogen through the module, the conduit comprising one or more heat exchangers thermally coupling the conduit to one or more stages of the plurality of stages. Such conduits can generally be used for obtaining temperatures below 4 kelvin, particularly where the cryogen is helium. The cryogenic cooling assembly may therefore comprise a helium refrigeration plant, the helium refrigeration plant preferably arranged externally to the housing of each said module. In this case, one or more said modules preferably comprise a first helium heat exchanger thermally coupled to a said stage of the module, the helium heat exchanger arranged to receive a flow of liquid helium from the helium refrigeration plant. The one or more said modules preferably further comprise a second helium heat exchanger thermally coupled to a different said stage of the module, the second helium heat exchanger arranged to receive a flow of gaseous helium at a temperature below 100 K, preferably between 40-80 K, more preferably 50-70 K, from the helium refrigeration plant. Additionally, or alternatively, the cryogenic cooling assembly may comprise a nitrogen refrigeration plant, the nitrogen refrigeration plant preferably arranged externally to the housing of each said module. In this case, one or more said modules preferably comprise a nitrogen heat exchanger thermally coupled to a said stage of the module, the nitrogen heat exchanger arranged to receive a flow of liquid nitrogen from the nitrogen refrigeration plant. It will be appreciated that the nitrogen heat exchanger would be positioned on a different thermal stage from the first helium heat exchanger.

For sub-millikelvin cooling to be achieved, one or more modules of the system preferably comprise a dilution unit of a dilution refrigerator. A dilution unit comprises a still and a mixing chamber, as earlier discussed. In a particularly desirable implementation, the first said module comprises a first dilution unit and the second said module comprises a second dilution unit. For example, the first dilution unit may comprise a still mounted to a still stage of the plurality of stages for the first said module, and the second dilution unit may comprise a still mounted to a still stage of the plurality of stages for the second said module, wherein the still stages of the first and second modules are mechanically connected by an extension plate. The still stages are typically substantially coplanar, with the extension plate extending between the still stages. Depending on the application, it may be helpful to thermally couple the connected still stages by virtue of the extension plate, in which case it should have a relatively high thermal conductivity. However, there are some applications in which it may be desirable to have a low effective thermal conductivity between the connected still stages, for example so that a heat load applied to one still stage is not conducted to the other. In these circumstances, the effective thermal conductivity between the still stages of the first and second modules is preferably below 50 W/mK at a temperature of 20 K. This arrangement enables the two stills to be operated at different steady-state temperatures, as may be desirable for certain applications.

Similarly, the first dilution unit may comprise a mixing chamber mounted to a mixing chamber stage of the plurality of stages for the first said module, and the second dilution unit may comprise a mixing chamber mounted to a mixing chamber stage of the plurality of stages for the second said module, wherein the mixing chamber stages of the first and second modules are mechanically connected by an extension plate, the extension plate typically extending between coplanar mixing chamber stages. It may be desirable to physically connect the mixing chamber stages of the first and second modules without providing an effective thermal coupling, in which case the extension plate connecting the mixing chamber plates may be configured so that the effective thermal conductivity between the mixing chamber stages of the first and second modules is below 50 W/mK at a temperature of 20 K.

In one preferred implementation, the first said module comprises two or more dilution units, wherein the first dilution unit is preferably arranged so that a first still is on a first stage and a first mixing chamber is on a second stage, wherein the second dilution unit is preferably arranged so that a second still is on the first stage and a second mixing chamber is on a third stage, the second stage arranged between the first stage and the third stage. Each of the first, second and third stages may therefore be provided with an active source of cooling (in particular a still or mixing chamber). The second stage, for instance, is therefore not reliant on the cooling power of the neighbouring stages first and third stages in order to compensate for any heat loads applied to the second stage.

The system may be configured to enable a variety of experimental services to be run between different modules. The system preferably comprises a target assembly comprising electrical circuitry (e.g. cabling) extending within the internal volume for the system between one or more stages of the first module to one or more stages of the second module. For example, the target assembly may form part of a quantum computer. Each module may hence form a scalable platform for supporting quantum information processing devices.

Different cryogenic refrigerators can be provided in the different connected modules. In a particularly desirable implementation, the first said module comprises a cryogenic refrigerator in the form of a dilution unit or helium-4 refrigerator having a 1K pot, and the second said module or a third said module having a stage that is thermally coupled to a corresponding stage from the first said module comprises a cryogenic refrigerator in the form of a cryocooler and/or a reservoir for liquid cryogen. The reservoir may take the form of a dewar or any suitable tank/container holding liquid cryogens. If the reservoir and cryocooler are provided within a module then the reservoir may be arranged to collect a cryogen that is liquefied by operation of the cryocooler. The reservoir may be operable to cool one or more stages of the first said module, for example by flow of a cryogen along a conduit that is thermally coupled to the one or more stages of the first said module. The reservoir can act as a failsafe mechanism to maintain cryogenic temperatures within the module in the event of a power failure, for example as may otherwise affect operation of any cryocoolers. Typically the reservoir cools the components of the system passively through conduction in the event of a power failure, for example by being fixed to one or more stages of the system. Alternatively, active control is envisaged. For example, the system may further comprise a controller configured to operate the reservoir to cool one or more stages of the first said module in response to a change of state of a said cryogenic refrigerator in the system. The controller is typically an electronic controller, which may be battery-operated. The controller is preferably configured to monitor the operation of one or more cryocoolers in the system and to operate the reservoir to cool the one or more stages of the first said module in response to detecting a failure of a said monitored cryocooler. The failure may be an unexpected interruption of operation for a compressor, such as may result from a lack of electrical power or mechanical part failure.

One, more than one or preferably each said module in the system preferably further comprises a heat switch assembly connected to one or more stages of the plurality of stages, the heat switch assembly operable to selectively thermally couple adjacent stages of the plurality of stages. For example, the heat switch assembly may comprise one or more gas gap heat switches and/or one or more heat pipes. The heat switch assembly is operable to control the thermal conductivity across the assembly, for example to allow the stages to be in mutual high thermal conductivity during an initial cool down process from room temperature, and to thermally isolate the respective stages from each other at temperatures below 4 kelvin or during steady-state operation.

QIP systems may require a high cooling power applied to each of the lowest temperature stages. Therefore, in a particularly desirable implementation, the plurality of stages of the first said module comprise a still stage, a cold stage and a mixing chamber stage, the cold stage arranged between the still stage and the mixing chamber stage, the first said module further comprising three dilution units, each said dilution unit comprising a still thermally coupled to the still stage of the first said module, wherein the first dilution unit further comprises a mixing chamber thermally coupled to the cold stage, and wherein the second dilution unit and the third dilution unit each comprise a mixing chamber thermally coupled to the mixing chamber stage of the first said module.

One or more modules of the system is preferably configured to allow for convenient sample access and exchange by use of a secondary insert having experimental apparatus (typically including a sample) to be connected to the module. For example, one or more said modules may comprise a primary insert and a demountable secondary insert, the primary insert comprising a plurality of primary plates formed by respective stages of the module, the secondary insert comprising a plurality of secondary plates connected in a self-supporting structure, the system further comprising one or more adjustment members configured such that, when the secondary insert is mounted to the primary insert, the adjustment members cause the primary and secondary plates to be brought into conductive thermal contact.

The system design is particularly well suited for QIP applications and the building of server farms having 1000+ logical qubit systems with error correction. Such a large wiring requirement not only benefits from the increased experimental space achieved by connecting multiple modules but also the higher cooling power from, for example, connecting multiple dilution refrigerators within the same cryostat. The modularised design also enables a variety of cooling technologies to be implemented, spread across different modules, and facilitates new modes of operation, as discussed above. A second aspect of the invention is a quantum information processing device comprising a cryogenic cooling system according to the first aspect. Features discussed in connection with the first aspect of the invention are equally applicable to the second aspect.

BRIEF DESCRIPTION OF THE DRAWINGS

Embodiments of the invention will now be discussed with reference to the accompanying drawings, in which.

DETAILED DESCRIPTION

Figure 1:
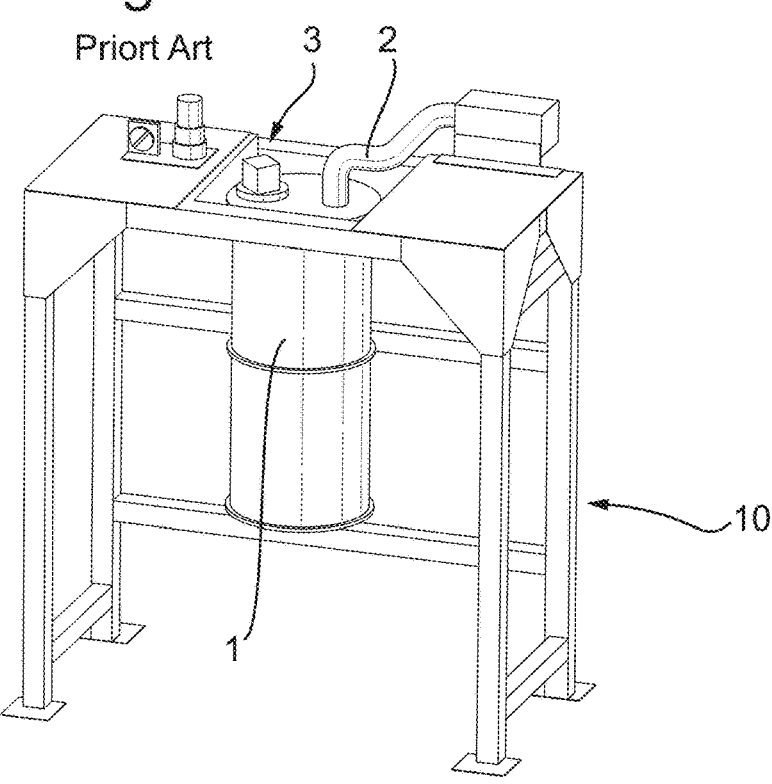
FIG. 1 is a perspective outer view of a cryogenic refrigerator according to the prior art.
Figure 2:
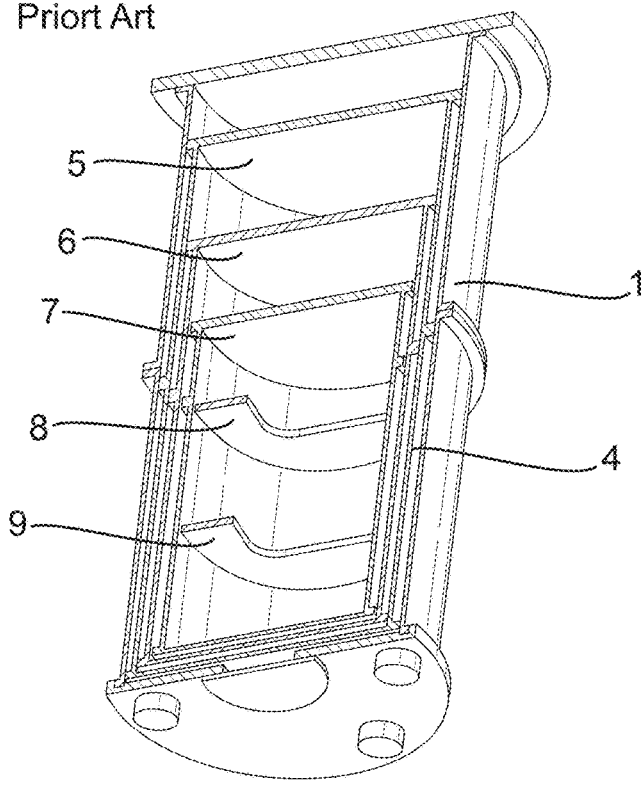
FIG. 2 is a perspective cross-sectional view of a cryogenic refrigerator according to the prior art.
Figure 3:
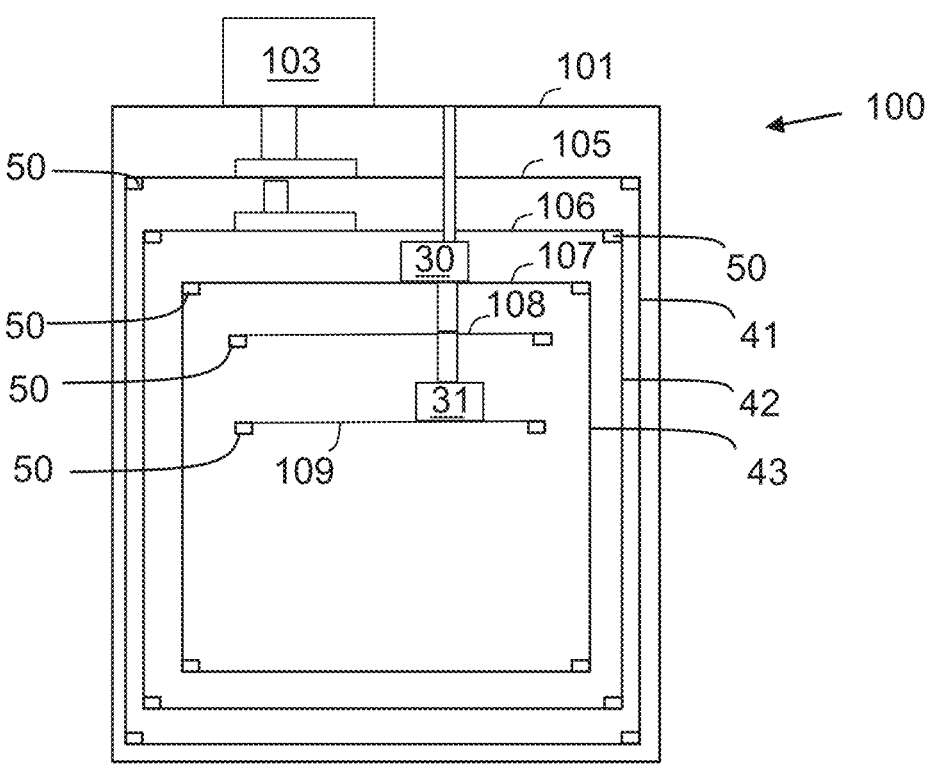
FIG. 3 is a schematic illustration of a first module for forming part of a system according to a first embodiment.

A first module 100 for forming part of a cryogenic cooling system according to a first embodiment of the invention will now be discussed with reference to FIGS. 3-5. The module 100 comprises a generally cuboidal housing 110 with six orthogonal faces, which is in contrast to the traditional cylindrical design shown in FIGS. 1 and 2. The housing has a framework 21 (see FIG. 4) supporting four orthogonal side faces extending between an upper surface and a lower surface of the housing 110. The upper surface supports a tiered assembly of cooled stages 105-109 and two cryogenic refrigerators. The first cryogenic refrigerator is a mechanical refrigerator (also referred to as a "cryocooler"/"cryogen-free refrigerator") in the form of a pulse tube refrigerator (PTR) 103. Alternative mechanical refrigerators that can be used include a Gifford McMahon (GM) refrigerator and a Stirling refrigerator. The second cryogenic refrigerator is a dilution unit, comprising a still 30 and a mixing chamber 31, connected by a set of heat exchangers. The housing is configured to form a vacuum chamber 101 when fully assembled, with the interior of the chamber (containing the cryogenic refrigerators and the cooled stages 105-109) being evacuated in use.

The assembly of cooled stages 105-109 comprises a PT1 stage 105 and a PT2 stage 106. A first stage of the PTR 103 is mounted to the PT1 stage 105 for cooling the PT1 stage 105 to a base temperature of 50-70 K. A second stage of the PTR 103 is mounted to the PT2 stage 106 for cooling the PT2 stage 106 to a base temperature of 3-5 K. The assembly further comprises a still stage 107 and mixing chamber stage 109 that are thermally coupled to the still 30 and the mixing chamber 31 respectively. An operational fluid formed of a mixture of helium-3 and helium-4 is circulated around the dilution unit during operation through pumping lines. The still stage 107 and mixing chamber stage 109 obtain respective base temperatures of 0.5-2 K and 5-20 mK in use. A "cold plate" 108, forming an additional thermal stage (and so also referred to herein as the "cold stage"), is arranged between the still stage 107 and the mixing chamber stage 109 and obtains a temperature between that of the still stage 107 and mixing chamber stage 109, typically at 50-150 mK.

A heat switch assembly (not shown) comprising a plurality of gas gap heat switches selectively thermally couples each of the cooled stages 106-109 in use. The heat switch assembly is configured to allow thermal exchange between the cooled stages 106-109 during an initial cool-down procedure and to thermally isolate the different stages at low temperatures. Optionally one or more heat pipes may also be provided, for example between the PT1 stage 105 and PT2 stage 106. The heat pipes may operate in conjunction with the PTR 103 and gas gap heat switches to further accelerate the precooling process. A combination of the gas gap heat switches, heat pipes and low thermal conductivity support rods connected to the housing 110 holds the stages 105-109 in the tiered arrangement shown.

A nested assembly of heat radiation shields is provided within the module 100, each heat radiation shield being connected to a respective thermal stage and surrounding the lower temperature components. A first heat radiation shield 41 is connected to the PT1 stage 105, a second heat radiation shield 42 is connected to the PT2 stage 106, and a third heat radiation shield 43 is connected to the still stage 107, wherein the second heat radiation shield 42 is arranged between the first heat radiation shield 41 and the third heat radiation shield 43. The first and second heat shields 41, 42 are typically aluminium whereas the third heat shield 43 is typically copper. The heat radiation shields 41-43 are configured to form a closed structure when fully assembled and mounted to the respective thermal stages, and will surround the components of the system that are configured to be cooled to a lower temperature. The heat radiation shields 41-43 have four orthogonal side surfaces, which are configured to fit together. In the present embodiment each side surface of each heat radiation shield comprises two coplanar removable panels for providing external access to the region contained by the heat radiation shield, as shown by FIG. 5. Handles are attached to the outside of the side faces for convenience during assembly and disassembly.

Figure 4:
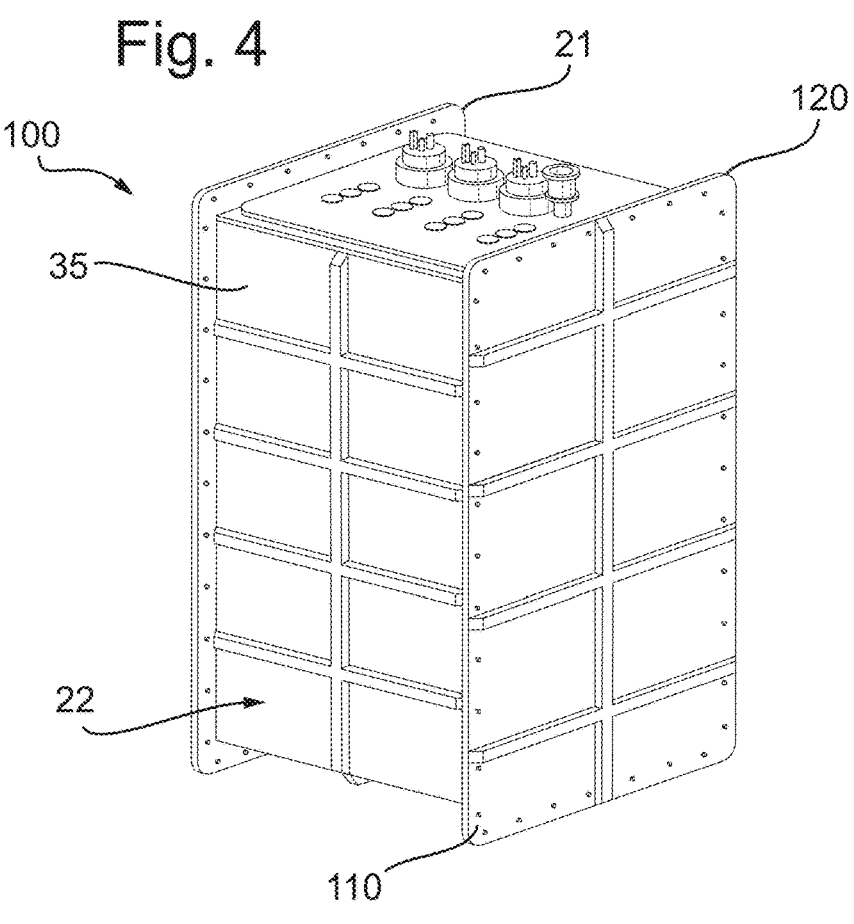
FIG. 4 is a first perspective view of the first module according to the first embodiment.
Figure 5:
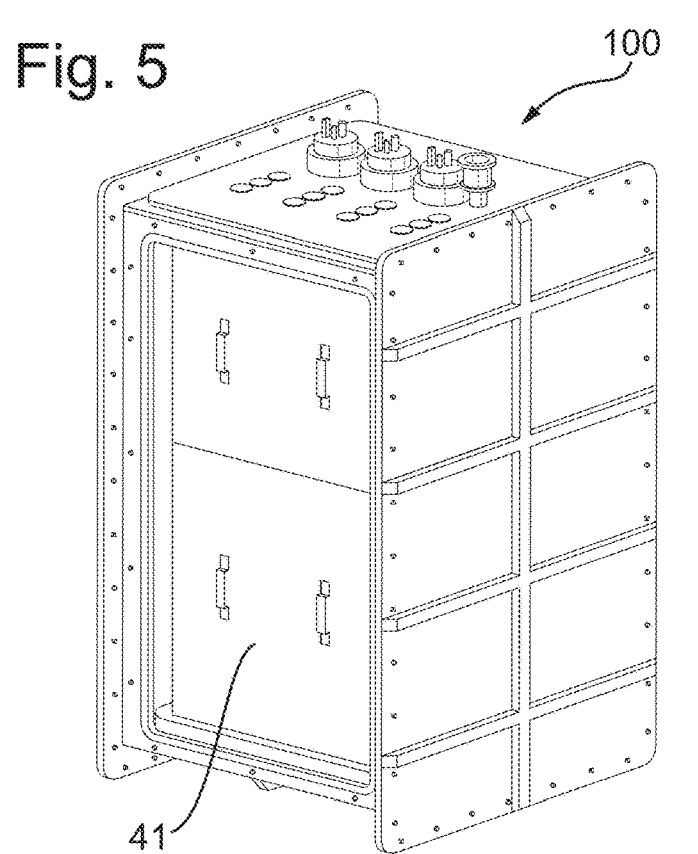
FIG. 5 is a second perspective view of the first module according to the first embodiment.

FIG. 4 provides on outer view of the module 100 in a first configuration with the housing 110 fully assembled. In the first configuration, the module 100 is configured to operate as an independent cryogenic cooling system in order to obtain cryogenic temperatures inside the module 100. In the present embodiment each side face of the housing 110 has a removable panel that may be removed from the framework 21 to provide access to an internal volume for the module 100 defined by the interior of the housing 110. In FIG. 5 a front removable panel 35 (visible in FIG. 4) is removed from a front side face 22 of the module 100 to expose a front side surface of the first heat radiation shield 41, which may also be removed if needed, for example for servicing.

Figure 6:
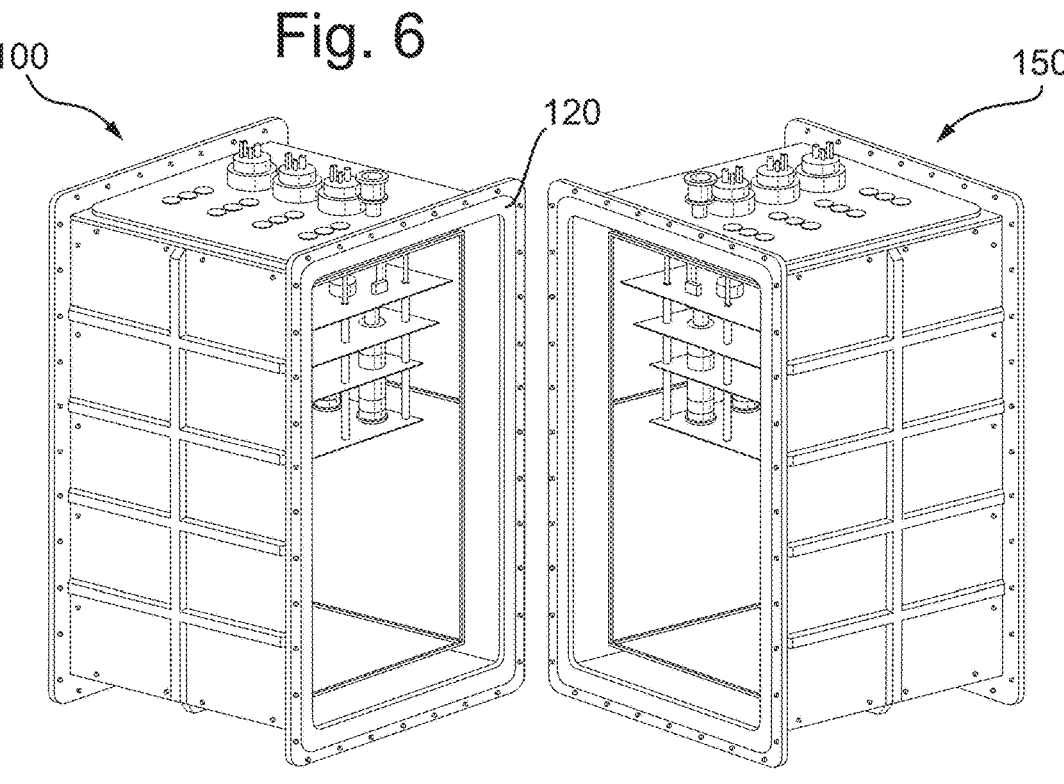
FIG. 6 is a perspective view of first and second modules for forming a system according to the first embodiment
Figure 7:
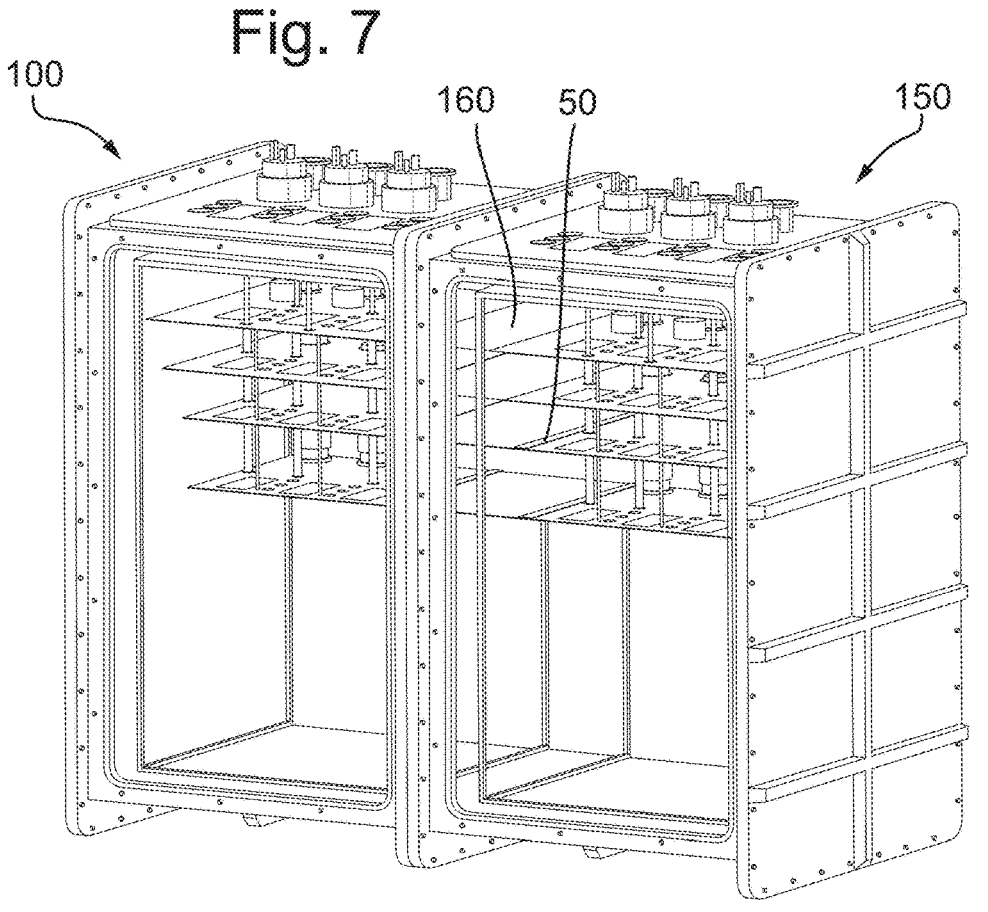
FIG. 7 is a perspective view of a cryogenic cooling system comprising the first and second modules according to the first embodiment.

Another example of where a removable panel may be removed from a side face of the module 100 is for connecting the module 100 to an adjacent module. The module 100 is further configured to operate in a second configuration as a part of an integrated cryogenic cooling system comprising a plurality of such modules connected at respective side faces. An example is shown in FIGS. 6 and 7 in which two such modules according to FIGS. 3-5 are joined together to form an integrated cryogenic cooling system according to the first embodiment. A removable panel is removed from the right side face of a first module 100 and a removable panel is removed from the left side of a second module 150, as shown in FIG. 6. The first and second modules 100, 150 are then arranged so that the right side face of the first module 100 abuts against the left side face of the second module 150. The framework 21 for the first and second modules comprises housing connectors 120 comprising a flange on the exterior of the housing 110 and a sealing member arranged around the outside of the area for the removable panel. A said flange on the right side of the first module 100 is arranged fit to a said flange on the left side of the second module 150 by fastening members, such as bolts, coupling the flanges together.

Once connected, the first and second modules 100, 150 form a common cryogenic cooling system with an internal volume comprising the sum of the internal volume of the connected modules. This is shown in FIG. 7. The housings of the modules 100, 150 engage together to hermetically sealed internal volume of the system comprising the stages from each module can be evacuated. The heat radiation shield side surfaces on the right side of the first module 100 and the left side of the second module 150 are removed. Additional radiation shield side surfaces and side faces of the module housings may be removed during assembly of the system to provide access and then refitted. This arrangement creates a large sample space to run much larger experiments than can otherwise be run in a typical single-unit cryostat. This has the advantage of not only more space, but of much more cooling power because one or more neighbouring thermal stages of the different modules are thermally coupled together.

In the present embodiment, the first and second modules 100, 150 are configured so that when the first module 100 is connected to the second module 150 by the housing connectors 120, each thermal stage of the first module is coplanar with a respective thermal stage of the second module 150. This means that adjacent coplanar thermal stages can then be connected together by an extension plate 160 extending between adjacent coplanar thermal stages. The extension plate 160 may provide a structural benefit in increasing the rigidity of the assembly and have a heat shielding effect. The extension plate 160 may also be used for heat transfer purposes, for example to couple the cooling power from a cryogenic refrigerator on one of the modules across to a thermal stage on another module. In this case, a material of a high thermal conductivity, such as copper may be used to form the extension plate. Stage connectors 50, in the form of an array of holes and bolts or any other suitable fastening means for connecting with an extension plate, are provided at the periphery of each stage 105-109. These are shown schematically in FIG. 3, wherein the stage connectors 50 are provided at each end of each of the thermal stages to enable the stages to be extended in either direction for connection to an adjacent module on the left side or the right side of the module 100.

As earlier discussed, the radiation shields 41-43 surround the lower temperature components of the system and are fitted to each of the PT1 stage 105, PT2 stage 106 and still stage 107 respectively. The width of the PT2 stage 106 is therefore less than that of the PT1 stage 105, the width of the still stage 107 is less than that of the PT2 stage 106, the width of the cold plate 108 and the mixing chamber stage 109 is also less than that of the still stage 107. Consequently, the lateral separation between coplanar thermal stages of the two adjacent modules is not the same for each of the stages. Different sized extension plates 160 are therefore used bridge the gap between the stage connectors 50 on each of the stages, as shown by FIG. 8.

In the first embodiment, the first, second and third radiation shields 41-43 are configured to surround the lower temperature components of the system. In the configuration shown in FIG. 3, each radiation shield has four orthogonal side surfaces, however when connected to another module in the system, at least one of these side surfaces is removed. This allows for experimental services, such as cabling, to extend between the different modules. A plurality of shield extension sections 180, in the form of plates, are fitted for connecting coplanar surfaces of the radiation shields for connected modules. Direct physical contact between the adjacent radiation shields is not typically essential however shield connectors 55 are preferably provided at each end of each of the radiation shield to enable neighbouring shield extension sections 180 to interlock and preferably thermally couple. The shield connectors 55 may comprise any of interlocking features, a flexible joint, array of holes and bolts or any other suitable fastening means for connecting the shield extension sections 180.

Although only two modules are coupled together in the first embodiment, it will be appreciated that any number of modules could be connected together to increase the size of the system. Furthermore, the system is not limited to a one-dimensional array of connected modules but that two-dimensional arrays are also envisaged. A particular benefit of the cuboidal module design is that it allows for modules to be fitted close together. This makes efficient use of the available floor space. It also means that the housings for the adjacent modules can be directly connected onto each other, thereby removing the need for any "spacers" between the module which increase the size and mass of the system, and which can therefore negatively impact on the cooling performance.

Figure 8:
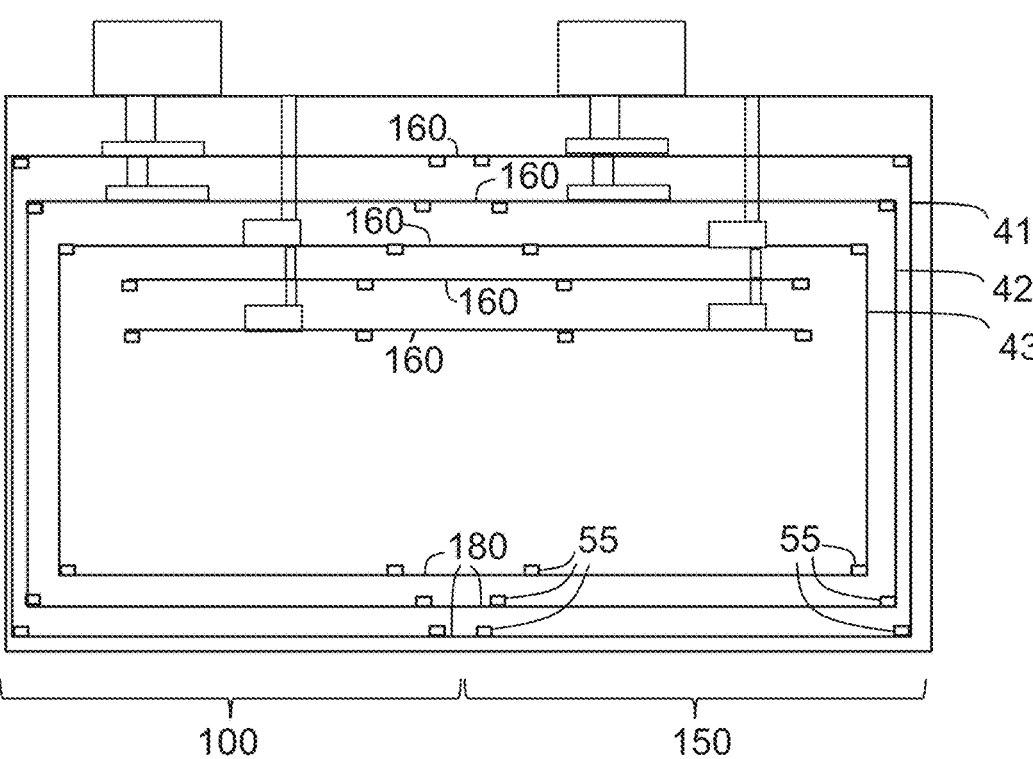
FIG. 8 is a schematic illustration of a first arrangement of the cryogenic cooling system comprising the first and second modules according to the first embodiment.
Figure 9:
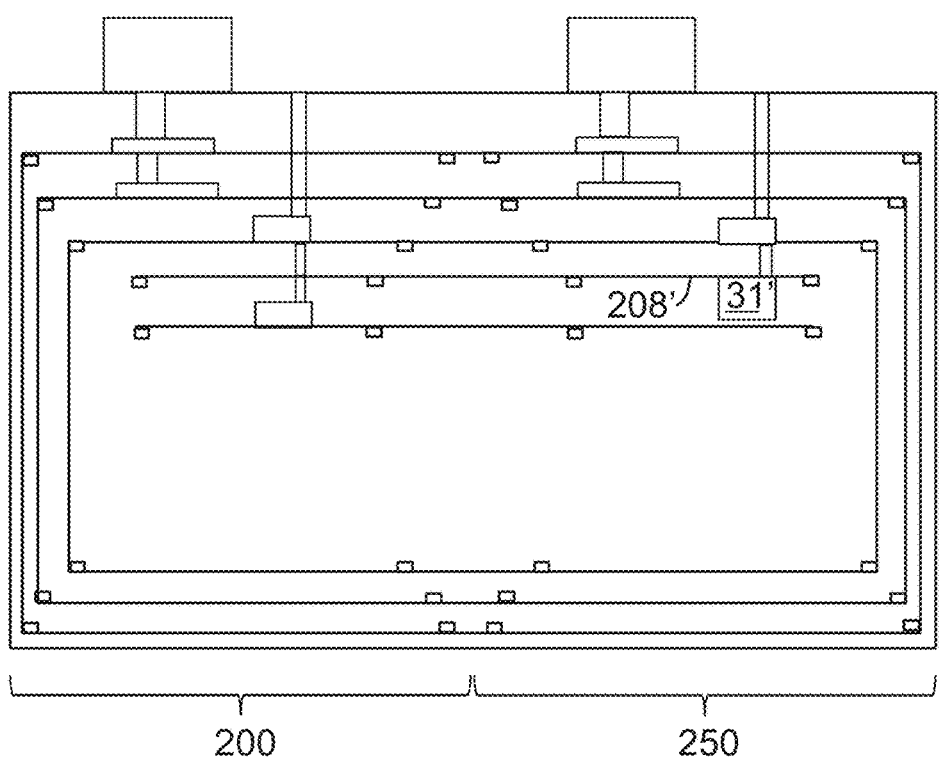
FIG. 9 is a schematic illustration of a cryogenic cooling system according to a second embodiment.

In the first embodiment of FIG. 8 two modules 100, 150 are coupled together that have the same cryogenic refrigerator set-up in each. In particular, each module forms a cryogen-free dilution refrigerator with the PTR and dilution unit being arranged as discussed with reference to FIG. 3. However, a particular advantage offered by the modularised design is the flexibility to have different refrigerator setups in different modules of the system. FIG. 9 illustrates a second embodiment which is essentially the same as the first embodiment however the mixing chamber 31' of the second module 250 is mounted on the cold plate 208'. The cooling power applied to the cold plate 208' is therefore significantly increased in comparison with the first embodiment. This cooling power is also transmitted through to the cold plate from the first module 200 by the copper stage extension plate thermally coupling the coplanar cold plates. The cold plate of the first and second module 200, 250 therefore are not wholly reliant on the cooling power of the neighbouring stages but have a dedicated source of cooling. This means they have a greater capacity to tolerate heat loads, as may be applied by components of a QIP system for instance, without substantially raising the operational temperature of the system.

Figure 10:
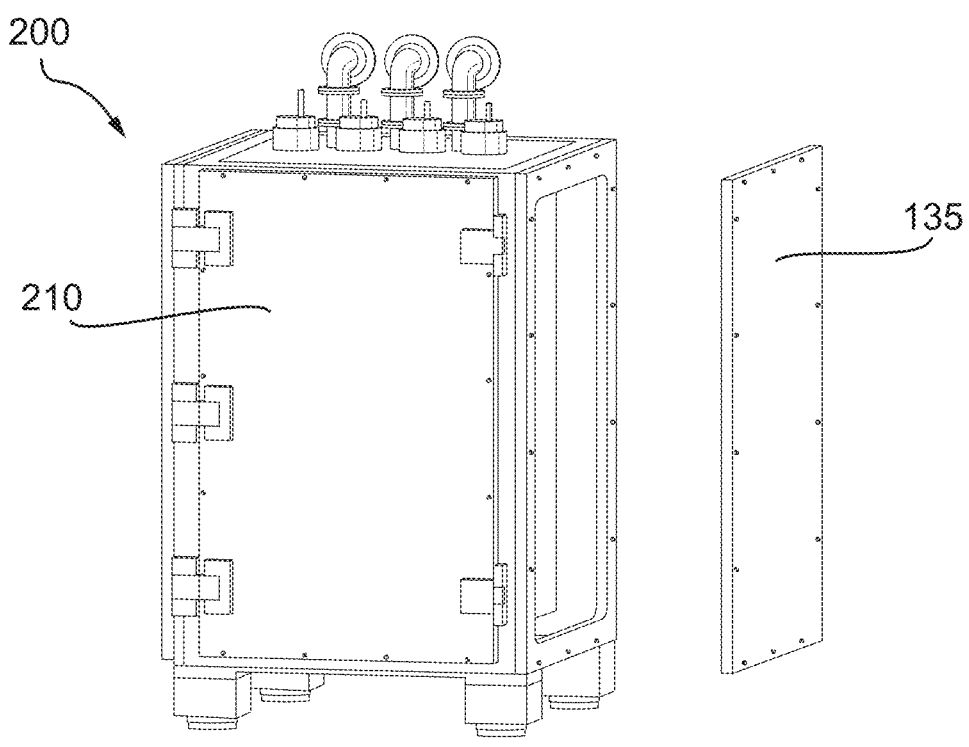
FIG. 10 is an exploded perspective view of a first module forming part of the second embodiment.
Figure 11:
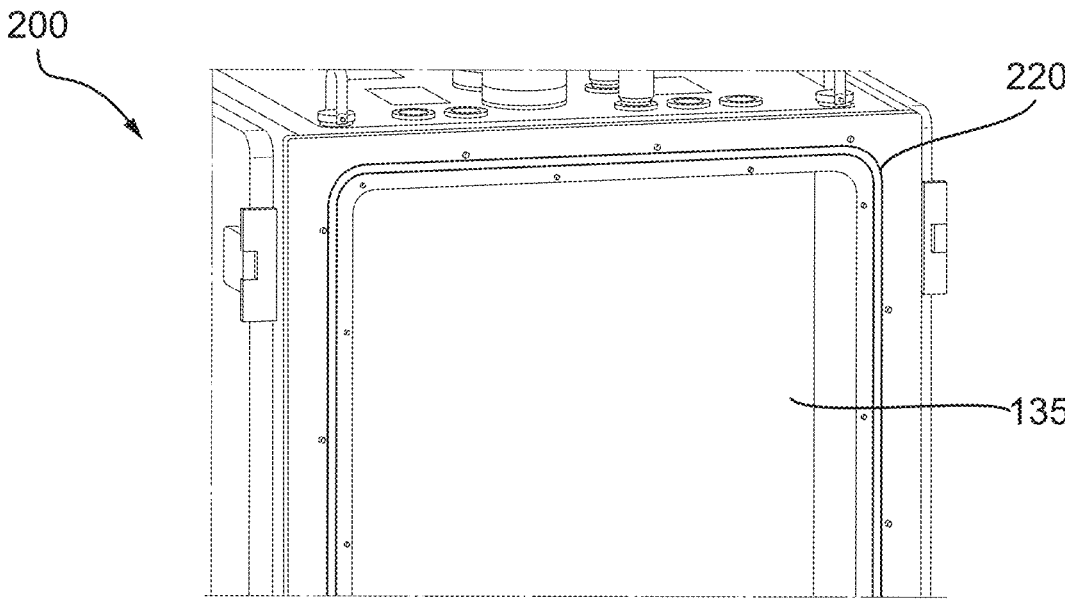
FIG. 11 is a perspective view of a portion of the first module according to the second embodiment.

FIGS. 10 and 11 show perspective views of the first module 200 from the second embodiment. Similar to the first embodiment, a housing connector 220 is provided on each of the two opposing side faces for connecting the module 200 directly onto an adjacent module. The housing connector 220 comprises a sealing member 220 surrounded by an array of bolts and holes. In this embodiment the housing connector on the right side face of the first module 200 is configured to connect to a corresponding housing connector on the left side face of the second module 250. A removable panel 135 may be fitted to each housing on the left and right side faces by bolts in order to enclose the internal volume for the module 200 and facilitate independent operation of the module 200. The removable panel 135 is removed to allow for the connection of the module 200 to one or more adjacent modules. The sealing member 220 enables a vacuum-tight seal to be made between the connected housings. In this embodiment the sealing member 220 comprises an O-ring groove and an O-ring on the right side face of the first module 200, which is configured to engage with an O-ring seal provided on the left side face of second module 250. However other types of sealing members could be used, such as a knife-edge gasket seal.

The front face of the module 200 comprises a door 210 that is securely fitted to the housing by hinges and bolts so that a vacuum can be maintained inside the housing. The door 210 can be opened in order to provide access to the interior of the module 200, for example during servicing and to adjust any bolts, such as those provided on the side faces of the housing or the radiation shields.

Figure 12:
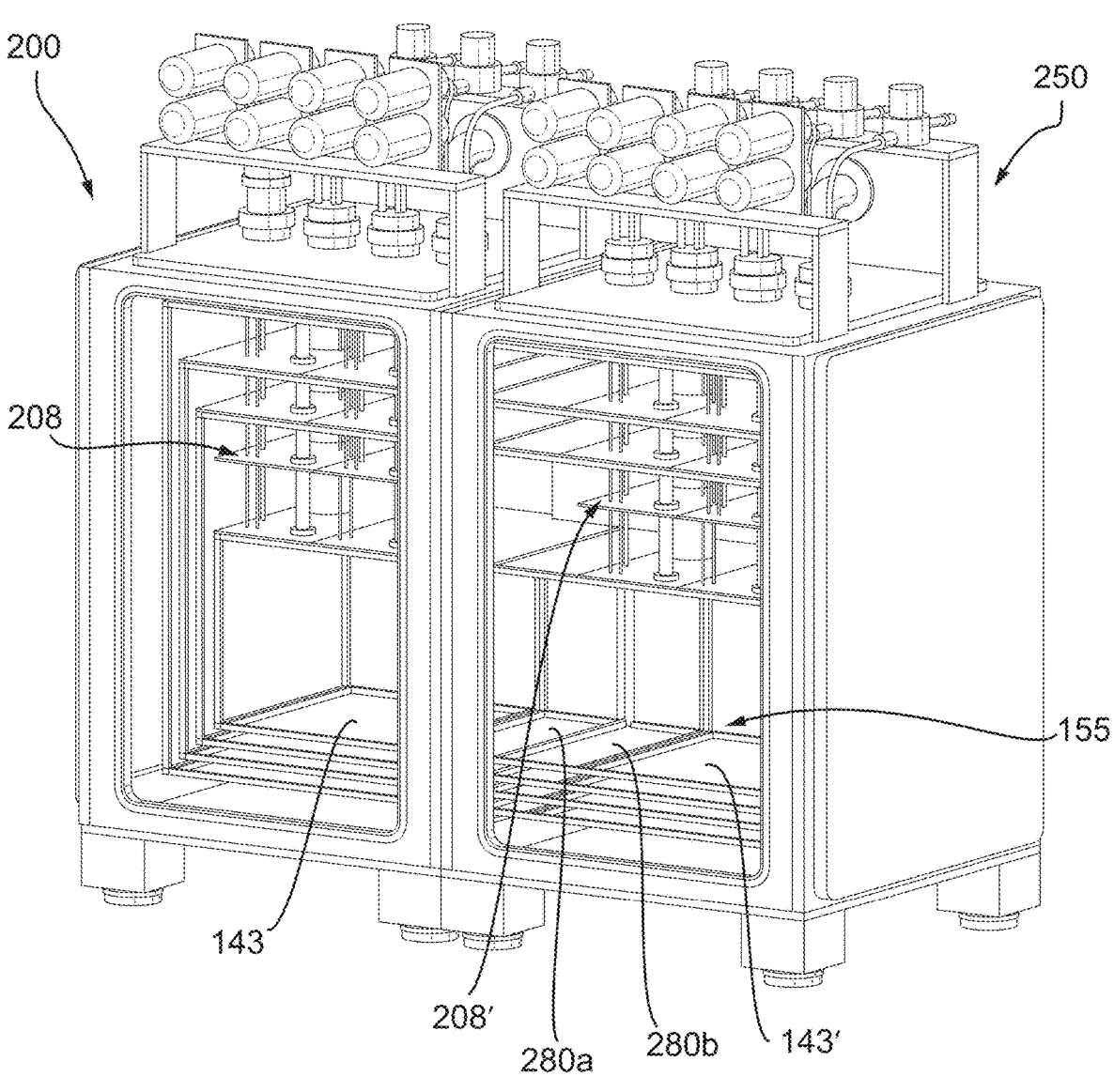
FIG. 12 is a perspective view of a cryogenic cooling system according to a third embodiment.

FIG. 12 shows a perspective view of the system according to a third embodiment in which the doors 210 of each module 200, 250 are not shown in order to illustrate the various connections between the two modules 200, 250. The third embodiment is essentially the same as the second embodiment and uses the same general module design. However, in the third embodiment, the extension plate between the cold plates 208, 208' is removed so that the cold plate 208 of the first module 200 is disconnected and thermally decoupled from the cold plate 208' of the second module 250. In an alternative embodiment any of the thermal stages could be thermally decoupled without breaking their physical connection by use of an extension plate having a low thermal conductivity, for example being formed partially or fully of a material such as plastic or stainless steel. As an example, it may be desirable to thermally decouple adjacent coplanar stages so that heat from an electrical element on a thermal stage of a first module is not conducted across to the second module.

As each module of the system cools down from room temperature, the adjacent thermal stages will contract away from each other and may cool down at different rates depending on the exact configuration of each module. There will also be manufacturing tolerances to accommodate. To overcome these issues, thermal stages in each module may be joined 'indirectly' to each other by a flexible joint. An example of such a connection will now be discussed with reference to FIG. 13.

Figure 13:
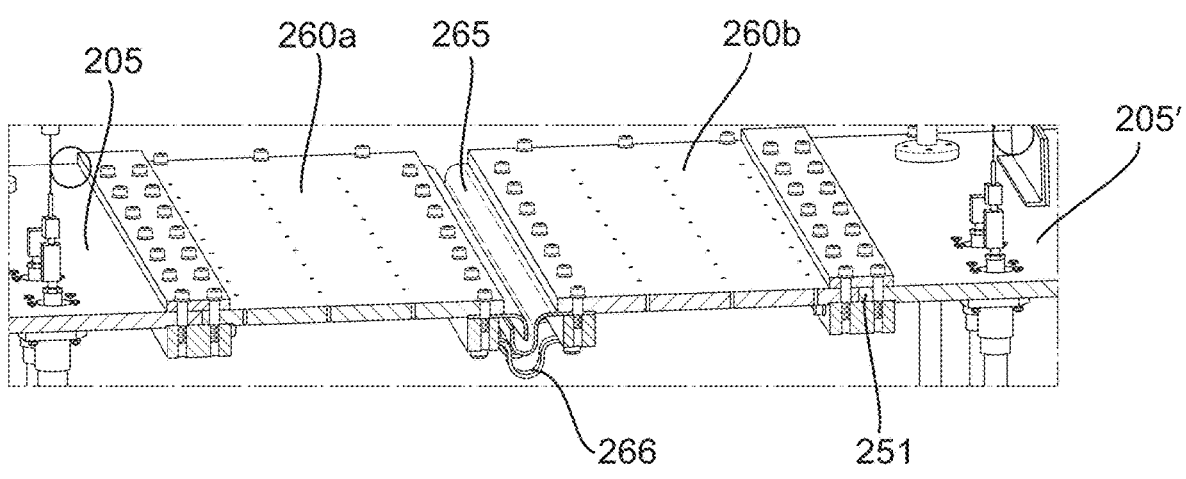
FIG. 13 is a perspective view of a first portion of the cryogenic cooling system according to the third embodiment.

FIG. 13 shows the connection between coplanar thermal stages of the first and second modules 200, 250 from the third embodiment. In particular, it shows the flexible mechanical connection that is made between the PT1 stage 205 of the first module 200 and the PT1 stage 205' of the second module 250. Similar connections are made between each of the remaining coplanar stages with the exception of the cold plates 208, 208' which are not connected (as earlier discussed). Stage connectors 251 are provided at the left side and the right side of each stage for allowing a connection between the coplanar stages by one or more intermediary extension plates. In this embodiment the PT1 stage 205 of the first module 200 is connected to the PT1 stage 205' of the second module 250 by first and second extension plates 260a, 260b. The underside of the first and second extension plates 260a, 260b are joined together by an expandable joint 266 comprising soft braids of high thermal conductivity, for example made of copper. The expandable joint 266 allows good heat conduction between the neighbouring PT1 stages 205, 205' and relative movement between the stages, such as may occur during thermal cycling.

A labyrinth structure 265 is provided to assist with radiative shielding in the region between the ends of the two extension plates 260a, 260b. The labyrinth structure 265 is formed by a downward pointing lip on the end of the first extension plate 260a which is arranged inside an upward pointing lip on the adjacent end of the second extension plate 260b. Additional light absorbing material may be applied to the interface between the two lips inside the labyrinth structure 265 to further assist with the heat shielding. The labyrinth structure 266 allows for relative movement between the first and second extension plates 260a, 260b, which may result in the lips coming into mutual contact. Other means for connecting adjacent thermal stages are envisaged including by using interlocking or interleaved parts that unroll when the connected stages contract, maintaining physical (and preferably also thermal) contact between the stages.

Figure 14:
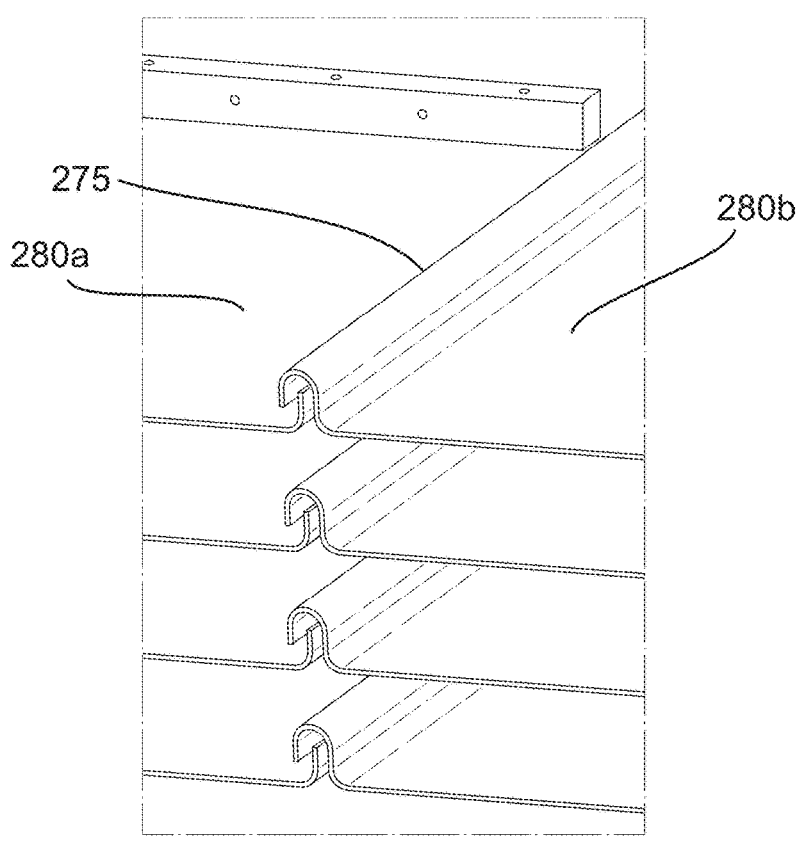
FIG. 14 is a perspective view of a second portion of the cryogenic cooling system according to the third embodiment.

Similar structures to those shown in FIG. 13 can be used to connect the heat radiation shields. As shown in FIG. 12, each of the coplanar heat shields from the first and second modules 200, 250 are coupled together by two shield extension sections. For example, a first shield extension section 280a is mounted to the third heat shield 143 of the first module 200 by a shield connector 155 taking a similar form to the stage connector 251 shown in FIG. 13. A second shield extension section 280b is mounted to the third heat shield 143 of the second module 250 by a similar shield connector 155. The first and second shield extension sections 280a, 280b are coupled together as shown in FIG. 14, by a shield labyrinth structure 275, which is similar to the labyrinth structure 266 discussed in connection with FIG. 13. In this case, the end of the first shield extension section 280a forms a lip that is arranged inside another lip formed on the end of the second shield extension section 280b. This engagement allows for some relative movement between the shield extension sections 280a, 280b, such as may occur during thermal cycling and allows for some misalignment due to manufacturing tolerances. Similar couplings are provided between each of the adjacent coplanar shield extension sections.

In effect, the system provides an extensible cryostat comprised of an extensible vacuum chamber and extensible temperature stages. This extensibility allows for a plurality of independent cryostats (or "modules") to be strongly mechanically and strongly thermally coupled together and operated with the same or similar temperatures at corresponding/adjacent thermal stages of each cryostat, as discussed with reference to FIGS. 7-9. The extensibility also allows for a plurality of modules to be strongly (or weakly) mechanically coupled together, and operated as a single entity, with different temperatures at the corresponding/adjacent thermal stages of each module. FIG. 12 shows an example in which coplanar cold plates 208, 208' are separated and therefore thermally decoupled from each other. Another example will now be discussed.

Figures 15, 16:
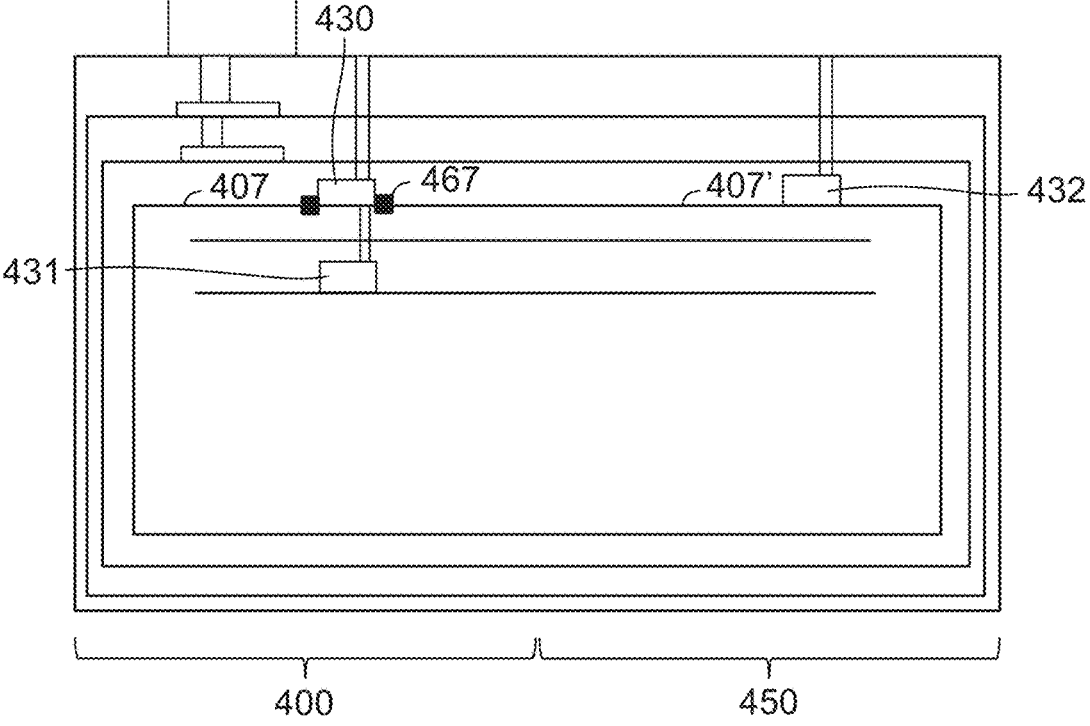
FIG. 15 is a schematic illustration showing a system according to a fourth embodiment of the invention.
FIG. 16 is a schematic illustration showing a system according to a fifth embodiment of the invention.

FIG. 15 is a schematic illustration showing a system according to a fourth embodiment of the invention, the fourth embodiment having anisothermal connected stages. A first module 300 is connected to a second module 350 to form an integrated cryogenic cooling system. The arrangement is essentially the same as the first embodiment with the exception that the still stage 307, cold stage 308 and mixing chamber stage 309 of the first module are not thermally coupled to the corresponding still stage 307', cold stage 308' and mixing chamber stage 309' of the second module 350. All other coplanar stages are thermally coupled as before. A first stage extension plate mechanically connects the still stage 307 of the first module 300 to the still stage 307' of the second module 350, and a second stage extension plate mechanically connects the mixing chamber stage 309 of the first module 300 to the mixing chamber stage 309' of the second module 350. This improves the structural rigidity of the system and the thermal shielding. However, the first and second stage extension plates are configured to have a low thermal conductivity, preferably below 50 W/mK at a temperature of 20 K. This enables the coplanar connected stages to reach different operational temperatures, and may be achieved in a number of ways. For example, the first and second stage extension plates may be partially or wholly constructed out of a material having a relatively low thermal conductivity at the respective operational temperature, such as plastic, silicon or stainless steel. In this embodiment copper stage extension plates are used as before but they are connected together by a stainless steel expandable joint 366. The cold stage 308 of the first module 300 is separated from the cold stage 308' of the second module 350 by gap so that the adjacent cold stages 308, 308' are substantially thermally isolated from each other and may have different temperatures in use.

In this embodiment, the system forms part of a QIP system in which the first module 300 comprises the 'input' lines 381 and the second module 350 comprises the 'output' lines 383 (schematically represented). Electrical conductors in the form of input lines 381 and output lines 383 are thermally coupled to each of the cooled stages of the first and second modules 300, 350 respectively. The input lines 381 transmit an electrical signal from a position exterior to the system to a QIP device 382 (e.g. a qubit processor), that is typically thermally coupled to the lowest temperature stage of the system. The output lines 383 transmit an electrical signal from the QIP device 382 to a position exterior to the system. Since the input lines are one of the biggest sources of heat generated a QIP experiment, via active and passive heat dissipation at the different stages of the refrigerator, it is beneficial to be able to operate the output lines at a lower temperature than that of the input lines. This preserves the signal to noise ratio in the output signals before those signals can be amplified. Typically the operational temperature of the still stage 307, cold stage 308 and mixing chamber stage 309 of the first module 300 will exceed that of the still stage 307', cold stage 308' and mixing chamber stage 309' of the second module 350 respectively. Optionally additional cryogenic refrigerators may be thermally coupled to the input lines 381 relative to the output lines 383 so as to compensate for the higher heat load provided by the input lines 381. For example, the arrangement shown in FIG. 15 could be modified so that two PTRs and two dilution units are provided in the first module 300.

The ability to 'split up' the cooling stages by only weakly thermally coupling them together is also useful for applications where a high heat load is more effectively managed by a first cryogenic refrigerator on a cooling stage operating at one temperature, but where that temperature is not advantageous to the correct operation of another cryogenic refrigerator connected to the cooling stage. An example will now be discussed with reference to FIG. 16, which is a schematic illustration showing a system according to a fifth embodiment of the invention. A first module 400 is connected to a second module 450 to form an integrated cryogenic cooling system. The arrangement is similar to the first embodiment although components of a QIP system are not shown for clarity. The first module 400 has a pulse tube refrigerator and a dilution unit comprising a still 430 and a mixing chamber 431, as before. However, the only cryogenic refrigerator provided in the second module 450 is a helium-4 refrigerator, referred to in the art as a "1-K pot" 432, configured to receive a flow of helium from an external location by pumping lines. The 1-K pot 432 is connected to a "1 K stage" 407' that is thermally coupled to the still stage 407 by one or more stage extension plates, as earlier described. An additional difference is that the still 430 is connected to the still stage 407 by a weak thermal link 467, such as a plastic or stainless steel collar.

The assembly may form part of a QIP system having any number of connected electrical elements that can provide a heat source. A large heat load applied to the still stage 407 can be effectively managed by the relatively high cooling power of the thermally coupled 1-K pot operating at 1-1.5 K or 1.2-2 K. The still of a dilution unit ideally operates in the 750-850 mK region. Therefore, the weak thermal link 467 advantageously allows the dilution unit to operate in a more optimum regime, independent of the temperature of the 1-K pot. This reduces the overall base temperature of the mixing chamber 431, which may improve the performance of the QIP measurement.

Figure 17:
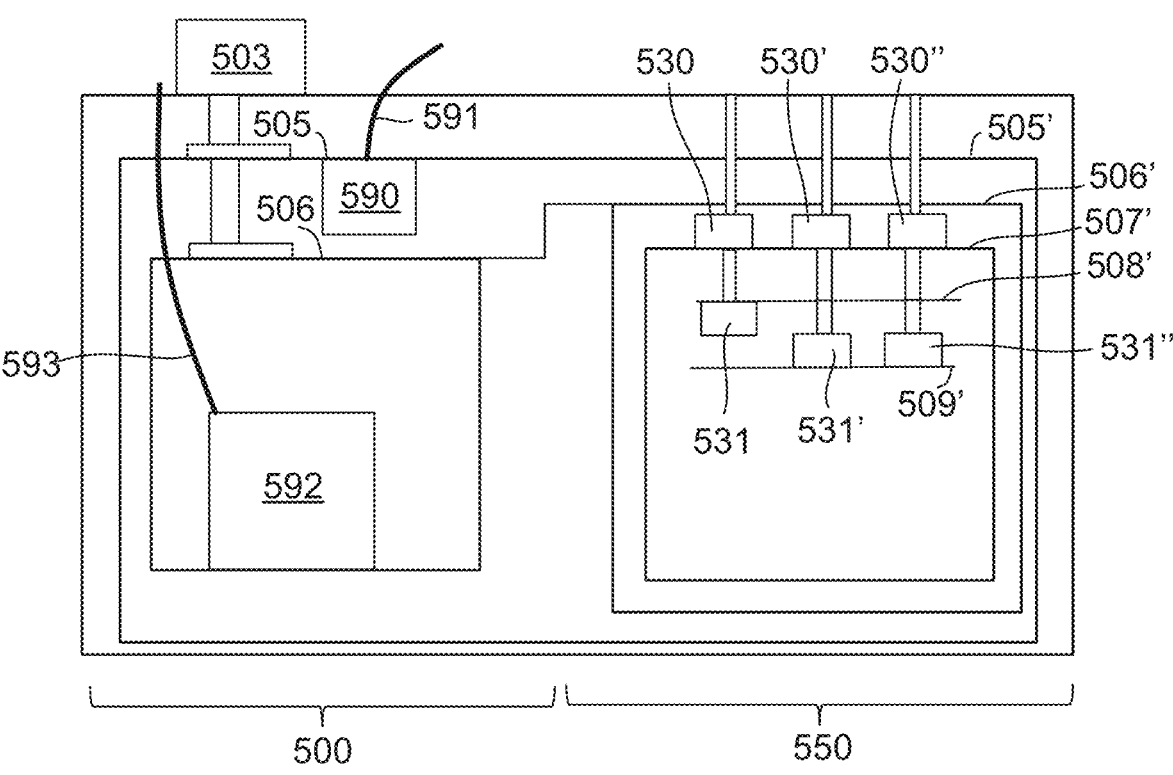
FIG. 17 is a schematic illustration showing a system according to a sixth embodiment of the invention.

Different types of modules serving different purposes can be connected together to form part of the integrated cooling system. FIG. 17 is a schematic illustration showing a system according to a sixth embodiment of the invention. A first module 500 is connected to a second module 550 to form an integrated cryogenic cooling system. In this embodiment the first module 500 comprises a pulse tube refrigerator 503 having a first cooling stage connected to a PT1 stage 505, and a second cooling stage connected to a PT2 stage 506 (as before). In this embodiment the PT1 stage 505 and the PT2 stage 506 are thermally coupled to a first tank 590 and a second tank 592 respectively. The first tank 590 is mounted to the PT1 stage 505 and the second tank 592 is mounted to a radiation shield thermally coupled to the PT2 stage 506. Each tank is configured to store a liquid cryogen in use. More specifically, the first tank 590 is configured to receive nitrogen which is introduced into the system along a first conduit 591 and which typically liquefies under thermal contact with the PT1 stage 505. The second tank 592 is configured to receive helium-4 which is introduced into the system along a second conduit 593. The second conduit 593 is thermally coupled to the PT1 stage 505 and the PT2 stage 506 by heat exchangers such that the helium may liquefy upon thermal contact with the PT2 stage 506 during low temperature operation. As well as allowing these fluids to enter the first module 500 into the respective tanks 590, 592, the conduits 591, 593 provide a path for the gases to vent should the system need to warm up or the liquids boil off.

The second module 550 comprises a PT1 stage 505' and a PT2 stage 506' which are thermally coupled to the PT1 stage 505 and PT2 stage 506 of the first module 500 respective. Optionally, the second module 550 may further comprise a cryocooler to facilitate independent cooling of the second module (in particular the PT1 stage 505' and PT2 stage 506') absent the connection to the first module 500. Additionally, the second module 550 comprises three lower temperature thermal stages: a still stage 507', a cold plate 508' and a mixing chamber stage 509', and three dilution units connected to the lower temperature stages. The first dilution unit comprises a first still 530 and a first mixing chamber 531, the second dilution unit comprises a second still 530' and a second mixing chamber 531', and the third dilution unit comprises a third still 530" and a third mixing chamber 531". The first still 530, second still 530' and third still 530" are each thermally coupled to the still stage 507'. The second mixing chamber 531' and the third mixing chamber 531" are thermally coupled to the mixing chamber stage 509', whereas the first mixing chamber 531 is thermally coupled to the cold plate 508. The combination of three dilution units, one of which having a mixing chamber coupled to the intermediary cold plate, ensures that a high cooling power is provided to each of the lowest temperature stages 507', 508', 509'. This arrangement for the second module 550 is particularly effective at managing the heat loads typically introduced by the electrical elements of a QIP system.

A particular advantage provided by the first module 500 in this embodiment is that it acts as a fail-safe mechanism for cooling the second module 550 if necessary. In particular, the first and second tanks 590, 592 are configured to cool the PT1 stage 505' and the PT2 stage 506' of the second module 550 in the event of a failure of the PTR 503 or any cryocoolers in the system, such as may occur due to an interruption in the electrical power supply or a mechanical failure. In this embodiment, the first tank 590 (containing liquid nitrogen) is configured to maintain the temperature of the PT1 stage 505' at around 70 K and the second tank 592 (containing liquid helium) is configured to maintain the temperature of the PT2 stage at around 4 K. The fail-safe mechanism operates passively by virtue of the thermal coupling between the tanks 590, 592 to the remaining components of the system. In the absence of any electrical power, the temperature may gradually rise inside the system at a rate dependent on the insulation and the mass of the liquid cryogens in the tanks 590, 592. Typically, the temperature of the components inside the system would approach the boiling point of the liquid cryogen, and be fixed there whilst any external headloads are taken up by the latent heat of the liquid. If different tanks are provided for housing different cryogens then the temperature may settle at the higher boiling point of the cryogens. Only once the liquid has boiled away would the temperatures then start to increase further. Anticipated liquid volumes and heat loads should allow for 'hold times' of hours or days. The above system may therefore be capable of maintaining cryogenic temperatures below 100 K inside the system for at least 24 hours in the absence of any electrical power.

Alternatively, in some embodiments, the system comprises an electronic controller (typically battery operated) which is configured to detect a change in state of any cryocoolers in the system, such as may occur due to an unexpected power cut or mechanical failure. For example, the controller may monitor operation of a motor for the compressor in the PTR 503. In response to detecting the change in state, the controller may operate one or more pumps (forming part of the controller) to convey a cryogen, typically in liquid form, along conduits so as to cool one or more thermal stages of the system. The cryogen may be conveyed from a position internal to the system (such as the first and second tanks 590, 592 shown in FIG. 17) or from an external dewar.

The 4 K cooling power in dry dilution refrigerators has been historically provided by cryocoolers. The demand for these systems arose precisely because they are a dry technology. This simplified the supporting infrastructure and experience required to operate the system, making the systems more usable in the academic setting. For commercial-scale systems, however, there are reliability concerns associated with relying on multiple cryocoolers. As the experiment size grows, the available cooling power at 4 K also becomes inadequate very quickly. In a generous assumption, cryocoolers could realistically provide ~8 W of 4 K cooling power, assuming 4-off units each providing 2 W. This already represents a significant investment, with a relatively short lifespan. There is a strict duty cycle for parts which, if neglected, leads to degradation of the performance of the cryocooler. In an industrial setting, cooling power at 4 K provided by a plant-scale 4He recirculating system is desirable (commercial suppliers include Air Liquide and Linde Kryotechnik). Such systems are implemented on medical installations (such as for a suite of MRI machines) or in large physics and engineering experiments (such as at CERN and ITER), where high reliability and large cooling powers are essential. Standard commercial liquefier units are easily capable of liquefying 280 l/hr of 4He, which translates into an available 4 K cooling power of 200 W (liquefiers are available with a capacity of >3500 l/hr, equating to a 4 K cooling power of >2.5 KW). The helium liquid may be circulated in heat exchanger pipework inside one or more of the modules to give the required thermal contact to the 4 K cooling bus of a QIP system. Plant-level 4 K cooling mechanisms enable a plurality of dilution refrigerators to be operated on the same 4 K cooling loop. This may include separate quantum computers that may be performing separate calculations, but sharing the same precooling system. These quantum computers could be in the same module or separate modules connected within a common vacuum chamber. An embodiment in which components of the system are cooled by liquid cryogen received from an external refrigeration plant will now be discussed.

Figure 18:
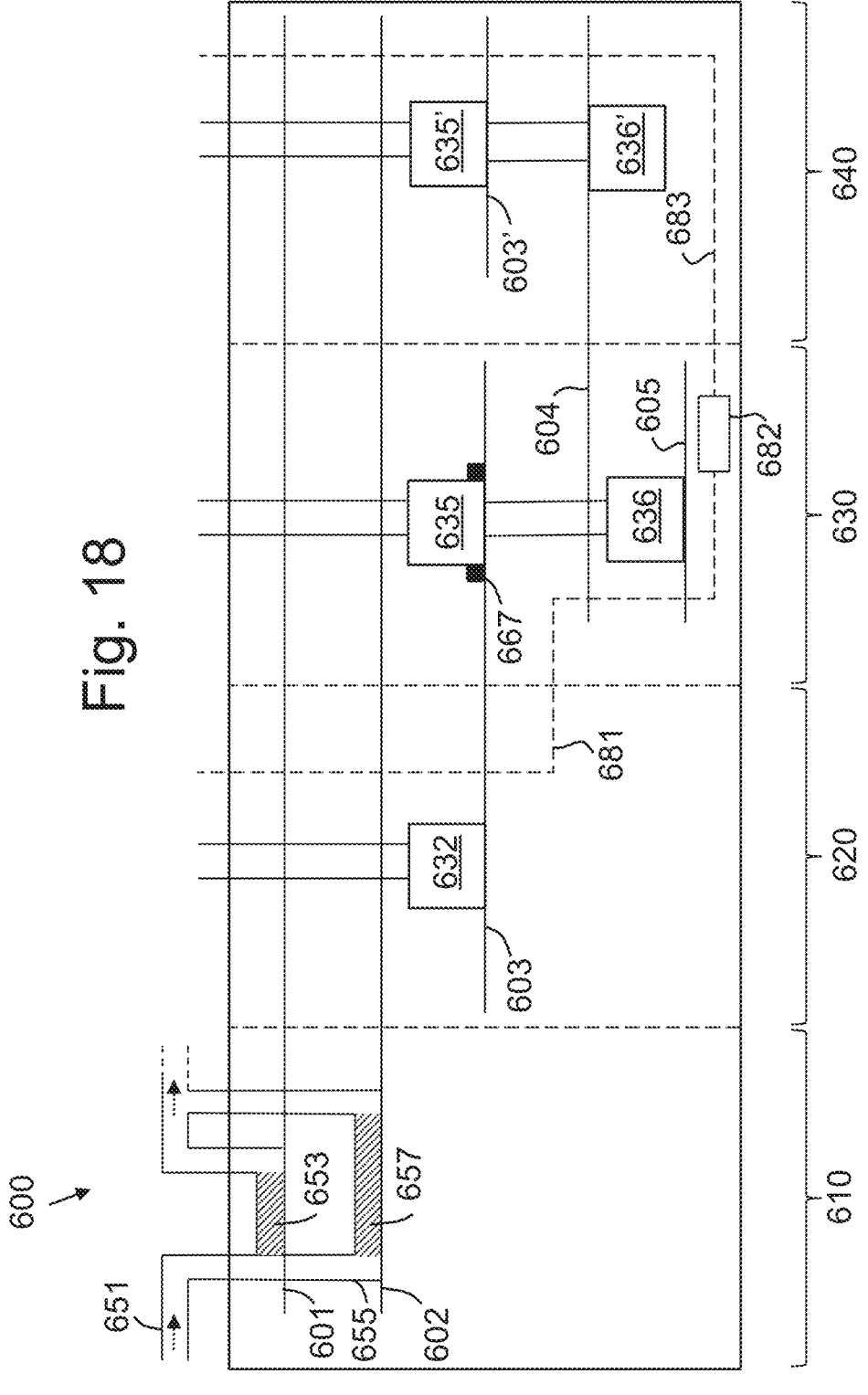
FIG. 18 is a schematic illustration showing a system according to a seventh embodiment of the invention.

FIG. 18 is a schematic illustration of a system 600 according to a seventh embodiment of the invention. The system 600 comprises a first module 610, a second module 620, a third module 630 and a fourth module 640. The modules are arranged as a one-dimensional array in which the second module 620 is connected to the first and third modules 610, 630 on opposing side faces, and the third module 630 is connected to the second and fourth modules 620, 640 on opposing side faces. The housings of the modules are connected together as described in the previous embodiments.

The first module 610 has a first conduit 651 for receiving a flow liquid nitrogen from a refrigeration plant (not shown) that is external to the modules. Alternatively, the first conduit 651 may receive a flow of cold helium gas tapped off from a helium refrigeration plant before the final liquefaction stage. The first conduit 651 is thermally coupled to a first stage 601 of the first module 610 by a first heat exchanger 653. The first module 610 also has a second conduit 655 for receiving a flow liquid helium from the refrigeration plant. The second conduit 655 is thermally coupled to a second stage 602 of the first module 610 by a second heat exchanger 657. In use, the first and second conduits are configured to cool first and second stages 601, 602 to around 50-70 K and 4 K respectively by the flow of the respective cryogens through the first and second heat exchangers 653, 657. This provides an alternative to the use of cryocoolers, which is particularly desirable in large-scale installations having over three connected modules, for the reasons discussed above.

A variant to this scheme is that the incoming liquid helium-4 stream is used to maintain a significant volume of liquid helium inside a reservoir tank, which is thermally connected to the second stage. The use of internal helium reservoirs would allow the system to continue running if the liquefier operation is interrupted for a period of time. It should be noted that a helium liquefying system using cryocoolers (as discussed in FIG. 17) could be used in the same way if the required cooling power at the second stage is only of the order of a few watts. In this case the use of internal reservoirs would allow the system to continue running whilst the cryocooler liquefier was swapped for a standby unit, providing mitigation against cryocooler reliability concerns. For systems with low cooling power requirements where cryocoolers could be used instead of a plant scale helium-4 recirculating system, there are methods known in the art that could be used to mitigate against cryocooler reliability concerns other than cryocooler based liquefiers. However typically the number of cryocoolers fitted to the system would exceed what is strictly necessary for operation so that the system can operate with one or more cryocoolers inoperative.

Returning to the seventh embodiment, the first and second stages 601, 602 of the first module are thermally coupled to corresponding coplanar stages of the second, third and fourth modules 620, 630, 640 by stage extension plates (as earlier described) to form common isothermal stages across the system respectively. Optionally, the aforementioned first and second conduits 651, 655 may be connected to corresponding isothermal stage plates on each module by respective heat exchangers in a repeating manner, as indicated by the broken lines at the end of the first and second conduits 651, 655. Appropriate ports may be provided on the top surface of each module for facilitating this fluid flow into the modules and between the modules.

The second module 620 comprises a helium-4 refrigerator 632 (also referred to as a "1-K pot") configured to cool a third stage 603 to around 1 K. The third stage 603 is thermally coupled to a corresponding coplanar stage of the third module 630 however it is separated from a coplanar third stage 603' of the fourth module 640 by a gap. This enables the third stage 603' of the fourth module 640 to operate at a different temperature from the third stage 603 of the second and third modules 620, 630. This may be desirable in some instances, as earlier discussed with reference to the fourth embodiment.

The third module 630 has a fourth stage 604 that is thermally coupled to a corresponding thermal stage of the fourth module 640, and a fifth stage that forms the lowest temperature stage and which is not connected to any corresponding stages from connected modules. The third module 630 further comprises a first dilution unit having a first still 635 mounted to the third stage 603 by a weak thermal link 667 (as described in connection with the fifth embodiment of FIG. 16) and a first mixing chamber 636 mounted and thermally coupled to the fifth stage 605. The fourth module 640 comprises a second dilution unit having a second still 635' mounted to the third stage 603' of the fourth module 640 and a second mixing chamber 636' mounted to the fourth stage 604. This arrangement ensures that each of the thermal stages is thermally coupled to a respective cryogenic refrigerator, which can be particularly advantageous in compensating for heat loads, such as may be applied by any connected electrical apparatus.

Components of an optional QIP system are schematically represented in FIG. 18. The input lines 681 are sequentially connected to each of the first stage 601, second stage 602 and third stage 603 inside the second module 620. The input lines 681 then extend from the third stage 603 inside the second module 620 to the third module 630. The input lines 681 subsequently connect to each of the fourth stage 604 and fifth stage 605 inside the third module 630, and to a QIP device inside the third module 630, the QIP device being thermally coupled to the fifth stage 605. The input lines 681 are thereby cooled by each of the connected thermal stages and are arranged to transmit an electrical signal from a position exterior to the system 600 to the QIP device 682. Output lines 683 are arranged to transmit an electrical signal from the QIP device 682 to another position exterior to the system 600. The output lines 683 extend from the QIP device 682, into the fourth module 640, and then are sequentially connected to each of the fifth stage 605, fourth stage 604, third stage 603', second stage 602 and first stage 601 inside the fourth module 640.

The seventh embodiment is illustrative of how the common internal volume to the system 600, created by the connected modules, can be utilised for different parts of the QIP system. It also shows how cooled components from different modules can be utilised to compensate for heat loads applied by connected electrical apparatus (e.g. arising from operation of RF attenuators forming part of the input lines 681). In the present case, the relatively large heat load provided by the input lines 681 at the third stage 603 is mitigated by the cooling power of a dedicated 1-K pot 632 rather than the still of a dilution unit which may have less cooing power. The first still 635 is thermally isolated from the input lines 681 and the 1-K pot 632 by using a low thermal conductivity link 667. At the fourth stage 604, the heat load from the input lines 681 is taken up by the second mixing chamber 636', which forms part of a dedicated "cold stage dilution refrigerator". This leaves the first dilution unit in the third module 630 otherwise 'unloaded' so that the first mixing chamber 636 can operate optimally to reduce the temperature of the QIP device 682 and lower the overall base temperature for the system 600. In use, the fourth stage 604 typically obtains a base temperature of around 100-200 mK and the fifth stage 605 typically obtains a base temperature of around 10-20 mK or potentially lower depending on the heat load applied by any connected electrical apparatus.

It will be appreciated that the modularised approach described herein provides the user with flexibility to combine different modules having respective refrigerating arrangements according to the experimental need. For example, the operation of multiple closed loop (or open loop) refrigerators inside the cryostat (including dilution refrigerators, helium-3 or helium-4 refrigerators) allows the cooling power of several cooling systems to be combined, by mechanically strongly coupling and thermally strongly coupling their cooling stages together isothermally. This may be achieved by linking together the mixing chambers of multiple dilution units at the cold stage, using a material of high thermal conductivity. Alternatively the cooling power of several cooling systems may be separated, by mechanically strongly (or weakly) coupling, but weakly thermally coupling, their cooling stages together so that they are anisothermal. This may be achieved by having one mixing chamber of one dilution unit operating at one temperature and another mixing chamber of another dilution unit operating at a different temperature. Furthermore, the cooling at the PT2 stage (which generally has an operational temperature of approximately 4 K) may also be provided by any of (or any combination of) a cryocooler, a dry mechanical contact to the cold part of a helium recondensing system, or a connection to a liquid helium bath.

The stages of a module in the system may be considered to form a primary insert that is connectable to a secondary insert containing a target apparatus. The target apparatus may be conveniently loaded into the system and exchanged by the connection of the secondary insert to the primary insert, further increasing the customisability of the system. The secondary insert may comprise a plurality of secondary plates that are connected in a self-supporting structure, each secondary plate typically being connectable to a respective stage forming a primary plate of the primary insert. One or more adjustment members may be configured such that, when the secondary insert is mounted to the primary insert, the adjustment member(s) cause the primary and secondary plates to be brought into conductive thermal contact. For example, the adjustment member(s) may change the separation between the primary and secondary plates or they may comprise deformable member(s) forming part of a respective primary or secondary plate (as described in WO 2021/170,976 A1). A plurality of secondary inserts may be connectable to the primary insert, for example two or more secondary inserts may be connected on each of two opposing sides of the module (depending on the size and configuration of the module). Access to the secondary inserts may be conveniently enabled by a door on the side face of the housing, for example as shown in FIG. 10.

Each module may be considered to form a 'unit cell' of an extensible system. The modules may be configured to operate independently or coupled to adjacent modules to expand the cooling power of the system and the physical space inside, such that the modules operate as a single larger system as the experimental complexity grows. The connected modules in the system could serve different functions and may have a different size, shape or footprint from other modules in the system provided that the housings allow for mutual connection as earlier described. The extensible temperature stages facilitate the combination of a higher number of cryogenic cooling systems onto common temperature stages, for example to compensate for higher heat loads. The option to weakly thermally couple respective temperature stages allows for the stages to be sub-divided into different temperature regions, for example to allow optimal operation of the connected apparatus. Further preferred features and advantages are described above. Taken together, the system described herein provides a scalable cryogenic system that may be operable at millikelvin temperatures.

The invention claimed is:

1. A cryogenic cooling system comprising:
   a cryogenic refrigerator assembly comprising one or more cryogenic refrigerators; and
   two or more connected modules, each of the two or more connected modules comprising:
      a housing defining an internal volume of the module, the housing having a plurality of side faces; and
      a plurality of stages arranged within the internal volume of the module, wherein one or more of the plurality of stages is thermally coupled to the cryogenic refrigerator assembly, wherein the stages are planar and spaced apart along a common axis perpendicular to the planes of the stages;
   wherein the two or more said modules are mutually connected at respective side faces;
   wherein the housings of the connected modules together define a common internal volume of the system which is hermetically sealed from the surrounding environment; and
   wherein two or more stages of the plurality of stages of a first said module are connected within the common internal volume to respective stages of the plurality of stages of a second said module,
   the cryogenic cooling system further comprising a plurality of extension plates, wherein each of the two or more stages of the first module is mechanically connected to a corresponding stage of the plurality of stages of the second module by a respective extension plate of the plurality of extension plates.

2. The cryogenic cooling system of claim 1, wherein one or more of the extension plates thermally couples a connected stage of the two or more stages of the first module to a corresponding connected stage of the two or more stages of the second module.

3. The cryogenic cooling system of claim 1, wherein the extension plates are planar.

4. The cryogenic cooling system of claim 3, wherein the extension plates are coplanar with the respective connected stages of the first module and the second module.

5. The cryogenic cooling system of claim 1, wherein the extension plates are configured to support a target assembly comprising electrical circuitry extending within the internal volume of the system and between the stages of two or more said connected modules.

6. The cryogenic cooling system of claim 1, wherein each said module comprises an aperture in a said side face of the housing, wherein the aperture extends around the plurality of stages, wherein said aperture is arranged at an interface between the two or more connected modules, wherein the extension plates extend across the interface between the first module and the second module.

7. A cryogenic cooling system comprising:
a cryogenic refrigerator assembly comprising one or more cryogenic refrigerators; and
two or more connected modules, each of the two or more connected modules comprising:
a housing defining an internal volume of the module, the housing having a plurality of side faces; and
a plurality of stages arranged within the internal volume of the module, wherein one or more of the plurality of stages is thermally coupled to the cryogenic refrigerator assembly, wherein the stages are planar and spaced apart along a common axis perpendicular to the planes of the stages;
wherein the two or more said modules are mutually connected at respective side faces;
wherein the housings of the connected modules together define a common internal volume of the system which is hermetically sealed from the surrounding environment; and
wherein two or more stages of the plurality of stages of a first said module are connected within the common internal volume to respective stages of the plurality of stages of a second said module,
the cryogenic cooling system further comprising a plurality of expandable joints, each expandable joint of the plurality of expandable joints being configured to accommodate differential thermal contraction between connected stages of the plurality of stages of the first module and the plurality of stages of the second module.

8. The cryogenic cooling system of claim 7, further comprising a plurality of extension plates, wherein each stage of the two or more connected stages of the first module is connected to a corresponding stage of the two or more stages of the second module by a respective extension plate of the plurality of extension plates, wherein each expandable joint of the plurality of expandable joints forms part of a respective extension plate of the plurality of extension plates.

9. The cryogenic cooling system of claim 7, wherein one or more of the expandable joints thermally couples a respective connected stage of the two or more stages of the first module to a corresponding respective connected stage of the two or more stages of the second module.

10. The cryogenic cooling system of claim 1, wherein the two or more connected modules comprises three or more connected modules, wherein a first stage of the two or more connected stages of the first module is thermally coupled to a first stage of the two or more connected stages of the second module by a first stage of the two or more stages of a third said module.

11. The cryogenic cooling system of claim 1, wherein one or more of the two or more connected modules comprises a door provided on a side face of the plurality of side faces, wherein the door can be opened to provide access to the interior of the module.

12. The cryogenic cooling system of claim 1, wherein each said module is configured so that the housing has a prismatic form with a polygonal cross-section in a plane normal to the axis of alignment of the stages of the module.

13. The cryogenic cooling system of claim 1, wherein the housing of each module has a quadrilateral cross-section in a plane normal to the axis of alignment of the stages.

14. A cryogenic cooling system comprising:
a cryogenic refrigerator assembly comprising one or more cryogenic refrigerators; and
two or more connected modules, each of the two or more connected modules comprising:
a housing defining an internal volume of the module, the housing having a plurality of side faces; and
a plurality of stages arranged within the internal volume of the module, wherein one or more of the plurality of stages is thermally coupled to the cryogenic refrigerator assembly, wherein the stages are planar and spaced apart along a common axis perpendicular to the planes of the stages;
wherein the two or more said modules are mutually connected at respective side faces;
wherein the housings of the connected modules together define a common internal volume of the system which is hermetically sealed from the surrounding environment;
wherein two or more stages of the plurality of stages of a first said module are connected within the common internal volume to respective stages of the plurality of stages of a second said module; and
wherein the first said module comprises a first dilution unit, the first dilution unit comprising a still mounted to a still stage of the plurality of stages of the first said module; and wherein the second said module comprises a second dilution unit, the second dilution unit comprising a still mounted to a still stage of the plurality of stages of the second said module, wherein the still stages of the first and second modules are connected by a connecting member arranged within the internal volume of the system.

15. The cryogenic cooling system of claim 14, wherein the still stages of the first and second modules are thermally coupled by the connecting member.

16. The cryogenic cooling system according to claim 1, wherein each of the connected modules comprises a nested assembly of heat radiation shields, each said heat radiation shield of the nested assembly being connected to a respective stage of the plurality of stages of the module.

17. The cryogenic cooling system according to claim 16, further comprising a plurality of shield extension sections, each shield extension section of the plurality of shield extension sections connecting respective surfaces of the nested assembly of heat radiation shields of adjacent modules of the two or more connected modules, wherein each shield extension section is configured to allow relative movement between the connected surfaces of the nested assembly of heat radiation shields of the adjacent modules.

18. The cryogenic cooling system according to claim 17, wherein each shield extension section comprises a flexible joint.

19. The cryogenic cooling system of claim 16, wherein the combination of each heat radiation shield and its respective connected stage defines a quadrilateral profile when viewed in a plane extending across an interface between two connected modules of the two or more connected modules.

20. The cryogenic cooling system of claim 16, wherein the nested assembly of heat radiation shields of each module comprises a plurality of shield surfaces, each shield surface being detachable from the nested assembly and comprising a handle.

21. A cryogenic cooling system comprising:
a cryogenic refrigerator assembly comprising one or more cryogenic refrigerators; and
two or more connected modules, each of the two or more connected modules comprising:
a housing defining an internal volume of the module, the housing having a plurality of side faces; and
a plurality of stages arranged within the internal volume of the module, wherein one or more of the plurality of stages is thermally coupled to the cryogenic refrigerator assembly, wherein the stages are planar and spaced apart along a common axis perpendicular to the planes of the stages;
wherein the two or more said modules are mutually connected at respective side faces;
wherein the housings of the connected modules together define a common internal volume of the system which is hermetically sealed from the surrounding environment;
wherein two or more stages of the plurality of stages of a first said module are connected within the common internal volume to respective stages of the plurality of stages of a second said module; and
wherein the cryogenic refrigerator assembly is configured so that each of said two or more connected modules comprises a cryogenic refrigerator of the one or more cryogenic refrigerators, the cryogenic refrigerator for each of said two or more connected modules being thermally coupled to one or more of the plurality of stages of the module, the system further comprising a removable panel, wherein each said module is configured to operate in a first configuration as an independent cryogenic cooling system whereby the removable panel is fitted to the housing of the module in the first configuration to enclose the internal volume for the module, wherein each said module is further configured to operate in a second configuration as a component of an integrated cryogenic cooling system comprising a plurality of said modules mutually connected at respective side faces to form a shared internal volume for the system in which the stages for each said connected module are arranged, wherein in the second configuration the removable panel is removed from the housing.

22. The cryogenic cooling system of claim 1, wherein the cryogenic refrigerator assembly comprises a cryogen refrigeration plant arranged externally to the housing of each said module, the cryogen refrigeration plant being configured to supply a flow of cryogen; wherein one or more of the connected modules further comprises a heat exchanger assembly arranged to receive the flow of cryogen from the cryogen refrigeration plant and thermally coupled to one or more outer stages of the plurality of stages of the module.

23. The cryogenic cooling system of claim 22, wherein the one or more of the connected modules further comprises a dilution refrigerator configured to cool one or more inner stages of the plurality of stages of the module to lower temperatures than the outer stages are cooled by the cryogen refrigeration plant.

24. A quantum information processing device comprising the cryogenic cooling system according to claim 1, wherein the system further comprises a target assembly comprising electrical circuitry extending between the stages of two or more said connected modules.

25. A cryogenic cooling system comprising:
a cryogenic refrigerator assembly comprising one or more cryogenic refrigerators; and
two or more connected modules, each of the two or more connected modules comprising:
a housing defining an internal volume of the module, the housing having a plurality of side faces; and
a plurality of stages arranged within the internal volume of the module, wherein one or more of the plurality of stages is thermally coupled to the cryogenic refrigerator assembly;
wherein the two or more said modules are mutually connected at respective side faces;
wherein each module of the two or more connected modules forms a unit cell of an extensible system;
wherein the housings of the connected modules together define a common internal volume of the system which is hermetically sealed from the surrounding environment; and
wherein the system further comprises a plurality of flexible connections arranged within the internal volume of the system, wherein each stage of the plurality of stages of a first said module is connected to a corresponding stage of the plurality of stages of a second said module by a respective flexible connection of the plurality of flexible connections;
wherein one or more of the modules comprises a door provided on a side face of the plurality of side faces, wherein the door can be opened to provide access to the interior of the module.

26. The cryogenic cooling system according to claim 25, wherein a first stage of plurality of stages of the first module is thermally coupled to a first stage of the plurality of stages of the second module by a first flexible connection of the plurality of flexible connections.

27. A cryogenic cooling system comprising:
a cryogenic refrigerator assembly comprising one or more cryogenic refrigerators; and
two or more connected modules, each of the two or more connected modules comprising:
a housing defining an internal volume of the module, the housing having a plurality of side faces arranged so that the system forms a tessellating structure;
a plurality of planar stages arranged within the internal volume of the module, the stages being spaced apart along a common axis perpendicular to the planes of the stages;
a nested assembly of heat radiation shields, each heat radiation shield connected to a respective stage of the plurality of stages; and
a dilution unit comprising a still mounted to a still stage of the plurality of stages of the module;

wherein the two or more said modules are mutually connected at respective side faces, with the housings of the connected modules together defining a common internal volume of the system which is hermetically sealed from the surrounding environment;

wherein the system further comprises a plurality of extension plates, wherein one or more stages of the plurality of stages of a first said module is connected to a corresponding stage of the plurality of stages of a second said module by a respective extension plate of the plurality of extension plates, each said extension plate including an expandable joint to accommodate differential thermal contraction; wherein the still stages of the first and second modules are connected by an extension plate of the plurality of extension plates;

wherein the system further comprises a plurality of shield extension sections, each shield extension section connecting respective surfaces of the nested assemblies of heat radiation shields of adjacent connected modules; and wherein the combination of each heat radiation shield and its respective connected stage defines a quadrilateral profile when viewed in a plane extending across an interface between two connected modules of the two or more connected modules.

28. The cryogenic cooling system according to claim 7, wherein each expandable joint of the plurality of expandable joints is a flexible connection.

29. The cryogenic cooling system of claim 7, wherein at least one expandable joint of the expandable joints comprises interlocking or interleaved parts maintaining physical contact between connected stages of the plurality of stages of the first module and the plurality of stages of the second module during relative movement between the connected stages of the plurality of stages of the first module and the plurality of stages of the second module.

30. The cryogenic cooling system of claim 7, wherein at least one expandable joint of the plurality of expandable joints is positioned along the common axis between a stage of the plurality of stages of the first module and a corresponding opposing stage of the plurality of stages of the second module, and wherein the expandable joint blocks direct radiation between the stages of the first and second modules arranged on opposing sides of the expandable joint along the common axis.

\* \* \* \* \*